(12) United States Patent
Takeyama et al.

(10) Patent No.: US 6,334,919 B1
(45) Date of Patent: Jan. 1, 2002

(54) POLYMER COMPOSITION FOR TIRE AND PNEUMATIC TIRE USING SAME

(75) Inventors: Hidekazu Takeyama; Yoshihiro Soeda; Gou Kawaguchi; Tetsuji Kawazura; Osamu Ozawa; Giro Watanabe; Noriaki Kuroda; Masahiro Ikawa, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/276,745

(22) Filed: Mar. 26, 1999

Related U.S. Application Data

(62) Division of application No. 08/589,450, filed on Jan. 22, 1996, now Pat. No. 6,079,465.

(30) Foreign Application Priority Data

| Jan. 23, 1995 | (JP) | 7-8394 |
| Feb. 16, 1995 | (JP) | 7-28257 |
| Feb. 16, 1995 | (JP) | 7-28318 |
| Feb. 16, 1995 | (JP) | 7-28319 |
| Jun. 16, 1995 | (JP) | 7-150353 |

(51) Int. Cl.$^7$ ........................................ B60C 5/14
(52) U.S. Cl. ............... 156/123; 152/510; 152/548; 156/133
(58) Field of Search ................. 152/510, 548, 152/511, 512, DIG. 16; 156/115, 118, 123, 133

(56) References Cited

U.S. PATENT DOCUMENTS

| 4,130,534 A | 12/1978 | Coran et al. | 525/133 |
| 4,141,863 A | 2/1979 | Coran et al. | 525/146 |
| 4,197,379 A | 4/1980 | Coran et al. | 525/142 |
| 4,754,793 A | 7/1988 | Muhammed | 152/510 |
| 4,928,741 A | 5/1990 | Rye | |
| 5,040,583 A | 8/1991 | Lin et al. | 152/510 |
| 5,091,467 A | 2/1992 | Beers | 152/510 |
| 5,434,212 A | 7/1995 | Yatsunami et al. | 152/510 |
| 5,443,104 A | 8/1995 | Dollinger et al. | 152/510 |
| 5,523,351 A | 6/1996 | Colvin et al. | 525/124 |

FOREIGN PATENT DOCUMENTS

| CA | 729433 | 3/1966 | 152/510 |
| EP | 0 337 279 | 10/1989 | |
| EP | 350312 | 1/1990 | 152/510 |
| EP | 0 376 558 | 7/1990 | |
| EP | 0 633 152 A1 | 1/1995 | |
| JP | 47-31761 B | 8/1972 | |
| JP | 5-169909 | 7/1993 | 152/510 |
| JP | 5-170935 | 7/1993 | 152/510 |
| JP | 5-508435 A | 11/1993 | |
| JP | 5-318618 A | 12/1993 | |
| JP | 5-330307 A | 12/1993 | |
| JP | 6-40207 A | 2/1994 | |
| WO | WO-92/01575 | 2/1992 | |

*Primary Examiner*—Geoffrey L. Knable
(74) *Attorney, Agent, or Firm*—Finnegan, Henderson, Farabow, Garrett & Dunner, L.L.P.

(57) ABSTRACT

A polymer composition for a tire having an air permeation coefficient of $25 \times 10^{-12}$ cc·cm/cm$^2$·sec ·cmHg (at 30° C.) or less and a Young's modulus of 1 to 500 MPa, including (A) at least 10% by weight, based on the weight of the total polymer component, of at least one thermoplastic resin having an air permeation coefficient of not more than $25 \times 10^{-12}$ cc·cm/cm$^2$·sec·cmHg (at 30° C.) and a Young's modulus of more than 500 MPa and (B) at least 10% by weight, based on the total weight of the polymer component, of at least one elastomer component having an air permeation coefficient of more than $25 \times 10^{-12}$ cc·cm/cm$^2$·sec·cmHg (at 30° C.) and a Young's modulus of not more than 500 MPa, wherein the total amount (A)+(B) of the component (A) and the component (B) is not less than 30% by weight based on the weight of the total polymer component, and a pneumatic tire obtained therefrom.

2 Claims, 2 Drawing Sheets

POLYMER COMPOSITION FOR TIRE AND PNEUMATIC TIRE USING SAME

This is a divisional of application Ser. No. 08/589,450, filed Jan. 22, 1996 now U.S. Pat. No. 6,079,465.

BACKGROUND OF THE INVENTION

1. Field of the Invention

The present invention relates to a polymer composition for a tire superior in the balance between the resistance to air permeation and the flexibility. More specifically it relates to a polymer composition for a tire which enables the inner liner layer or other layer for prevention of air permeation to be made thinner and the tire to be made lighter, without detracting from the retention of air pressure of the pneumatic tire and also relates to a pneumatic tire using the above-mentioned composition for the air permeation prevention layer.

The present invention further relates to a pneumatic tire having an air permeation prevention layer which is superior in the balance between the resistance to air permeation and the flexibility, which is superior in the attachment and bonding of the inner liner layer or other air permeation prevention layer during the molding and vulcanization of the tire, and which enables the inner liner layer or other air permeation prevention layer to be made thinner and the tire to be made lighter without detracting from the retention of air pressure in the tire.

2. Description of the Related Art

The reduction of fuel consumption is one of the major technical problems to be solved in the automobile industry. There have been increasingly stronger demands for reduction of the weight of the pneumatic tires as part of this approach.

The inner surface of a pneumatic tire is provided with an inner liner layer composed of a low gas-permeable rubber such as butyl rubber or halogenated butyl rubber so as to enable the tire air pressure to be kept constant. A halogenated rubber, however, suffers from a large hysteresis loss. For this reason, when after vulcanization of the tire, there are waves formed in the inner surface rubber of the carcass layer and the inner liner layer in the space between the carcass cords and the inner liner rubber layer deforms along with the deformation of the carcass layer, there is the problem that the rolling resistance increases. Therefore, in general, the inner liner layer (i.e., halogenated butyl rubber) and inner surface rubber of the carcass layer are joined through a rubber sheet, which is called a tie gum having a small hysteresis loss. Accordingly, in addition to the thickness of the inner liner layer of the halogenated butyl rubber, there is added the thickness of the tie gum and the layer as a whole becomes a thickness of over 1 mm (i.e., 1000 $\mu$m). As a result, this becomes one factor increasing the weight of the final tire product.

Various proposals have been made for using various materials, in place of the low gas permeable rubber such as butyl rubber, as the inner liner layer of the pneumatic tire. For example, Japanese Examined Patent Publication (Kokoku) No. 47-31761 discloses the coating of the inner surface of a vulcanized tire having a thickness of 0.1 mm or less from a solution or dispersion of a synthetic resin such as polyvinylidene chloride, a saturated polyester resin, or a polyamide resin having an air permeation coefficient (cm$^3$ (standard state)/cm·sec·cmHg)) of 10×10$^{-13}$ or less at 30° C. and of 50×10$^{-13}$ or less at 70° C.

The technique disclosed in this publication is to provide the inner surface of the carcass or the inner surface of the inner liner of a vulcanized tire with a coating of a synthetic resin having a specific air permeation coefficient and making the thickness of the synthetic resin coating of 0.1 mm or less, but the pneumatic tire described in the publication had a problem in the bonding between the rubber and synthetic resin and further had a defect of an inner liner layer inferior in moisture resistance (or water resistance).

Japanese Unexamined Patent Publication (Kokai) No. 5-330307 discloses to halogenate the inner surface of the tire (using a conventionally known chlorination solution, bromine solution, or iodine solution) and form on top of that a polymer coating (thickness of 10 to 200 $\mu$m) of methoxymethylated nylon, a copolymer nylon, a blend of polyurethane and polyvinylidene chloride, or a blend of polyurethane and polyvinylidene fluoride.

Further, Japanese Unexamined Patent Publication (Kokai) No. 5-318618 discloses a pneumatic tire having a thin film of methoxymethylated nylon as an inner liner. According to this technique, the inner surface of a green tire is sprayed or coated with a solution or emulsion of methoxymethylated nylon, then the tire is vulcanized or alternatively the inner surface of a vulcanized tire is sprayed or coated with a solution or emulsion of methoxymethylated nylon so as to produce a pneumatic tire. Even in the art disclosed in these publications, however, the water resistances of the thin films are poor and it is difficult to maintain uniformity in film thickness.

Japanese Unexamined Patent Publication (Kokai) No. 6-40207 discloses an example of use of a multilayer film having a low air permeation layer composed of a polyvinylidene chloride film or ethylene-vinyl alcohol copolymer film and a bonding layer comprised of a polyolefin film, aliphatic polyamide film, or polyurethane film as the air permeation prevention layer of the tire. However, in this system, the low air permeation layer lacks flexibility and the film is unable to keep up with expansion and contraction during the use of the tire and therefore cracks.

Further, Japanese Unexamined Patent Publication No. 5-508435 proposes the use, as a tire inner liner composition, of a composition including a halogen-containing copolymer of a $C_4$ to $C_7$ iso-monoolefin and p-alkylstyrene plus carbon black, a plasticizer oil, and vulcanization agent as a tire inner liner, but this inner liner has an insufficient air permeation coefficient and is not suitable for reducing the weight of the tire.

As explained above, various materials have been proposed for the inner liner layer of a pneumatic tire, in place of butyl rubber, but none has yet been commercialized. In particular, no material has yet been developed superior in the balance of the resistance to air permeation and flexibility required as an inner liner layer of a pneumatic tire or a material superior in bonding with rubber.

SUMMARY OF THE INVENTION

Accordingly, the object of the present invention is to provide a polymer composition for a tire which is optimal for an air permeation prevention layer of a pneumatic tire which enables the tire to be made lighter and which is bondable with a rubber layer, without detracting from the retention of air pressure by the pneumatic tire and a pneumatic tire which constructs an air permeation prevention layer using the same.

Another object of the present invention is to provide a pneumatic tire having an air permeation prevention layer which enables the tire to be reduced in weight and is superior in the resistance to air permeation and the flexibility, without detracting from the retention of air pressure by the pneumatic tire, which may be formed even after the molding of the tire, and which is superior in the self-attachment (bonding) with the superposed films.

In accordance with the first aspect of the present invention, there is provided a polymer composition for a tire having an air permeation coefficient of $25 \times 10^{-12}$ cc·cm/cm²·sec·cmHg (at 30° C.) or less and a Young's modulus of 1 to 500 MPa comprising:

(A) at least 10% by weight, based on the weight of the total polymer component, of at least one thermoplastic resin having an air permeation coefficient of $25 \times 10^{-12}$ cc·cm/cm²·sec·cmHg (at 30° C.) or less and a Young's modulus of more than 500 MPa and (B) at least 10% by weight, based on the total weight of the polymer component, of at least one elastomer component having an air permeation coefficient of more than $25 \times 10^{-12}$ cc·cm/cm²·sec·cmHg (at 30° C.) and a Young's modulus of not more than 500 MPa, wherein the total amount (A)+(B) of the component (A) and the component (B) is not less than 30% by weight based on the weight of the total polymer component, and a pneumatic tire using this polymer composition for a tire for an air permeation prevention layer.

In accordance with the second aspect of the present invention, there is provided a polymer composition for a tire having an air permeation coefficient of $25 \times 10^{-12}$ cc·cm/cm²·sec·cmHg (at 30° C.) or less and a Young's modulus of 1 to 500 MPa comprising:

(A) at least 10% by weight, based on the weight of the total polymer component, of at least one thermoplastic resin having an air permeation coefficient of $25 \times 10^{-12}$ cc·cm/cm²·sec·cmHg (at 30° C.) or less and a Young's modulus of more than 500 MPa, (B) at least 10% by weight, based on the total weight of the polymer component, of at least one elastomer component having an air permeation coefficient of more than $25 \times 10^{-12}$ cc·cm/cm²·sec·cmHg (at 30° C.) and a Young's modulus of not more than 500 MPa, wherein the total amount (A)+(B) of the component (A) and the component (B) is not less than 30% by weight based on the weight of the total polymer component, and (C) in the thermoplastic resin of the component (A), 3 to 70% by weight, based on the total weight of the components (A), (B), and (C), of another thermoplastic resin with a critical surface tension difference of not more than 3 mN/m with the facing rubber layer when used as a tire, and a pneumatic tire using this polymer composition for a tire for an air permeation prevention layer.

In accordance with the third aspect of the invention, there is provided a pneumatic tire using as an air permeation prevention layer a polymer composition for a tire having an air permeation coefficient of $25 \times 10^{-12}$ cc·cm/cm²·sec·cmHg (at 30° C.) or less and a Young's modulus of 1 to 500 MPa comprising:

(A) at least 10% by weight, based on the weight of the total polymer component, of at least one thermoplastic resin having an air permeation coefficient of $25 \times 10^{-12}$ cc·cm/cm²·sec·cmHg (at 30° C.) or less and a Young's modulus of more than 500 MPa, (B) at least 10% by weight, based on the total weight of the polymer component, of at least one elastomer component having an air permeation coefficient of more than $25 \times 10^{-12}$ cc·cm/cm²·sec·cmHg (at 30° C.) and a Young's modulus of not more than 500 MPa, wherein the total amount (A)+(B) of the component (A) and the component (B) is not less than 30% by weight based on the weight of the total polymer component, and (D) in the thermoplastic resin of the component (A), 3 to 50% by weight, based on the total weight of the components (A), (B), and (D), of another thermoplastic resin having a melting point not more than the vulcanization temperature, and a pneumatic tire having an air permeation prevention layer obtained by superposing or coating a surface of a thin film of a polymer composition comprised of the components (A) and (B) with another thermoplastic resin (D) having a melting point not more than the vulcanization temperature, followed by vulcanizing.

In accordance with the fourth embodiment of the invention, there is provided a pneumatic tire obtained by superposing or coating between (i) an air permeation prevention layer having an air permeation coefficient of $25 \times 10^{-12}$ cc·cm/cm²·sec·cmHg (at 30° C.) or less and a Young's modulus of 1 to 500 MPa, composed of (A) at least 10% by weight, based on the weight of the total polymer component, of at least one thermoplastic resin having an air permeation coefficient of not more than $25 \times 10^{-12}$ cc·cm/cm²·sec·cmHg (at 30° C.) and a Young's modulus of more than 500 MPa and (B) at least 10% by weight, based on the total weight of the polymer component, of at least one elastomer component having an air permeation coefficient of more than $25 \times 10^{-12}$ cc·cm/cm²·sec·cmHg (at 30° C.) and a Young's modulus of not more than 500 MPa, wherein the total amount (A)+(B) of the component (A) and the component (B) is not less than 30% by weight based on the weight of the total polymer component, and (ii) a layer facing at least one surface of the air permeation prevention layer
a layer imparting bondability to the thermoplastic resin and
having a critical surface tension difference between the layer facing the air permeation prevention layer and the bondability imparting layer of not more than 3 mN/m; a pneumatic tire wherein the critical surface tension difference between the air permeation prevention layer and the bondability imparting layer is not more than 3 mN/m; and a process of producing a pneumatic tire comprising the steps of:
superposing or coating between a polymer composition for an air permeation prevention layer having an air permeation coefficient of $25 \times 10^{-12}$ cc·cm/cm²·sec·cmHg (at 30° C.) or less and a Young's modulus of 1 to 500 MPa, comprised of (A) at least 10% by weight, based on the weight of the total polymer component, of at least one thermoplastic resin having an air permeation coefficient of $25 \times 10^{-12}$ cc·cm/cm²·sec·cmHg (at 30° C.) or less and a Young's modulus of more than 500 MPa and (B) at least 10% by weight, based on the total weight of the polymer component, of at least one elastomer component having an air permeation coefficient of more than $25 \times 10^{-12}$ cc·cm/cm²·sec·cmHg (at 30° C.) and a Young's modulus of not more than 500 MPa, wherein the total amount (A)+(B) of the component (A) and the component (B) is not less than 30% by weight based on the weight of the total polymer component, and a layer facing at least one surface of the air permeation prevention layer, a thin film of a thermoplastic resin having a critical surface tension difference with the layer facing the air permeation prevention layer of not more than 3 mN/m, then processing and vulcanizing the same.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
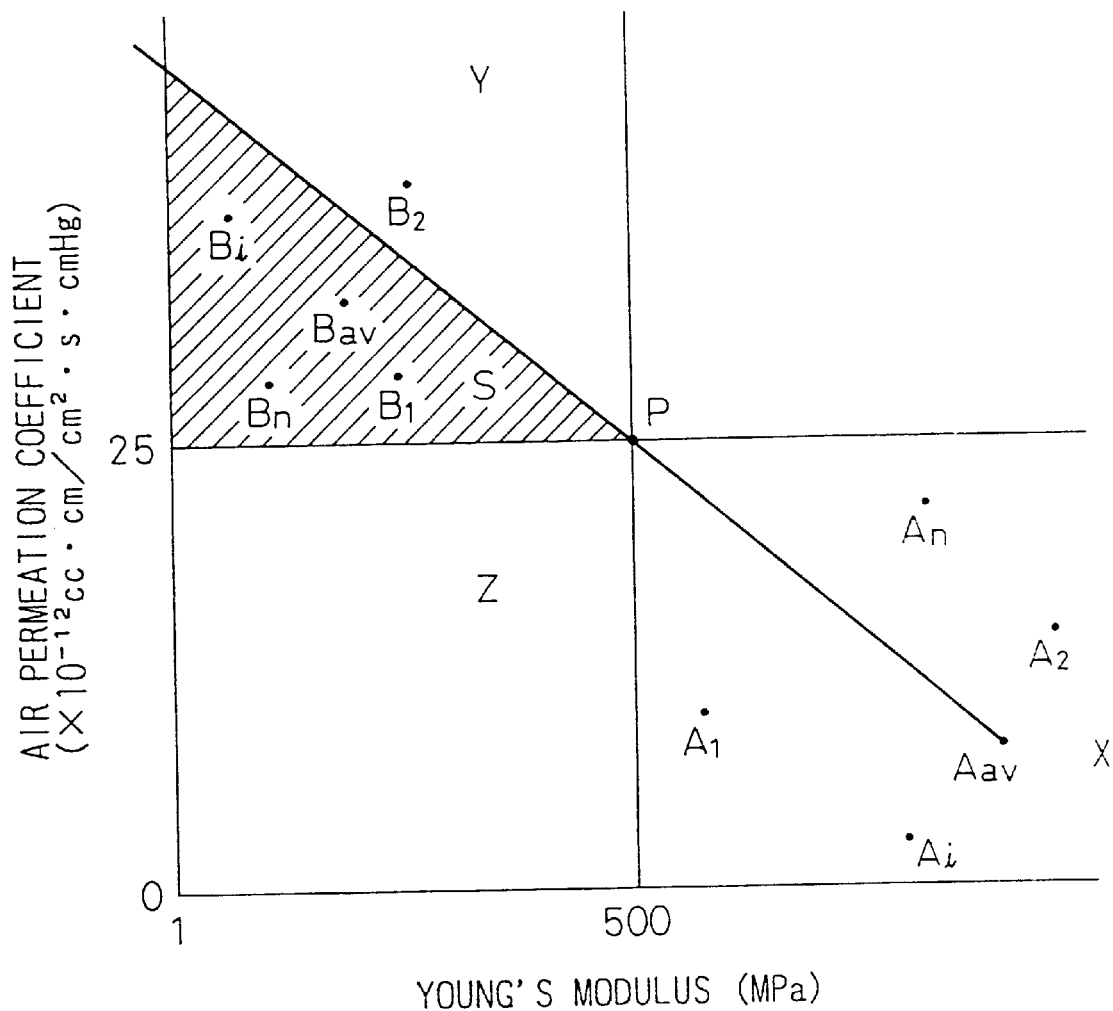
FIG. 1 is a graph showing the relationship between the air permeation coefficient and Young's modulus of the components (A) and (B) of the present invention and the polymer composition of the present invention.

The thermoplastic resins capable of blending in the polymer composition according to the present invention as the component (A) may be any thermoplastic resin having an air permeation coefficient of $25\times10^{-12}$ cc·cm/cm$^2$·sec·cmHg (at 30° C.) or less, preferably $0.1\times10^{-12}$ to $10\times10^{-12}$ cc·cm/cm$^2$·sec·cmHg (at 30° C.), and a Young's modulus of more than 500 MPa, preferably 500 to 3000 MPa. The amount compounded is at least 10% by weight, based on the total weight of the polymer component including the resin and rubber, preferably 20 to 85% by-weight.

Examples of thermoplastic resins are the following thermoplastic resins and any mixtures of them or containing them.

Polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, nylon 66/PPS copolymer, polyester resins (for example, polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxyalkylene diimide diacid/polybutyrate terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, methacrylonitrile/styrene/butadiene copolymer), polymethacrylate resins (for example, polymethyl methacrylate (PMMA), polyethyl methacrylate), polyvinyl resins (for example, vinyl acetate (EVA), polyvinyl alcohol (PVA), vinyl alcohol/ethylene copolymer (EVOH), polyvinylidene chloride (PVDC), polyvinyl chloride (PVC), polyvinyl/polyvinylidene copolymer, vinylidene chloride/methylacrylate copolymer), cellulose resins (for example, cellulose acetate, cellulose acetate butyrate), fluorine resins (for example, polyvinylidene fluoride (PVDF), polyvinyl fluoride (PVF), polychlorofluoro-ethylene (PCTFE), tetrafluoroethylene/ethylene copolymer (ETFE)), imide resins (for example, aromatic polyimides (PI)), etc. may be mentioned.

As explained above, these thermoplastic resins must have specific air permeation coefficients, Young's moduluses, and formulations. A material having a flexibility of a Young's modulus of 500 MPa or less and an air permeation coefficient of $25\times10^{-12}$ cc·cm/cm$^2$·sec·cmHg (at 30° C.) or less has not yet been developed on an industrial basis. Further, when the air permeation coefficient is more than $25\times10^{-12}$ cc·cm/cm$^2$·sec·cmHg (at 30° C.), the resistance to air permeation of the polymer composition for a tire is decreased and the composition does not function as an air permeation prevention layer of a tire. Further, even when the amount of the thermoplastic resin compounded is less than 10% by weight, the resistance to air permeation similarly declines and the composition does not be used as an air permeation prevention layer for a tire. The elastomer component blended into the resin composition of the present invention as the component (B) is any elastomer having an air permeation coefficient or more than $25\times10^{-12}$ cc·cm/cm$^2$·sec·cmHg (at 30° C.) and Young's modulus of 500 MPa or less or any blend thereof or an elastomer composition comprising thereof with necessary amounts of the blending agents generally blended with elastomers for the improvement of the dispersion, heat resistance, etc. of the elastomers or the like, such as reinforcements, fillers, cross-linking agents, softening agents, antidegradants, and processing aids. The amount compounded is at least 10% by weight, preferably 10 to 85% by weight, based on the total weight of the total amount of the polymer component including the resin and the elastomer component constituting the air permeation prevention layer.

The elastomer constituting the elastomer component is not particularly limited in so far as it has the above-mentioned air permeation coefficient and Young's modulus. Examples of such an elastomer component are as follows, but mention may be made of the following:

Diene rubbers and the hydrogenates thereof (for example, NR, IR, epoxylated natural rubbers, SBR, BR (high cis BR and low cis BR), NBR, hydrogenated NBR, hydrogenated SBR), olefin rubbers (for example, ethylene propylene rubber (EPDM, EPM), maleic acid modified ethylene propylene rubbers (M-EPM), IIR, isobutylene and aromatic vinyl or diene monomer copolymers, acryl rubbers (ACM), and ionomers), halogen-containing rubbers (for example, brominated butyl rubbers (Br-IIR), chlorinated butyl rubbers (Cl-IIR), brominated isobutylene paramethylstyrene copolymers (Br-IPMS), chloroprene rubbers (CR), hydrin rubbers (CHR, CHC), chlorosulfonated polyethylenes (CSM), chorinated polyethylenes (CM), maleic acid modified chlorinated polyethylenes (M-CM)), silicone rubbers (for example, methylvinyl silicone rubbers, dimethyl silicone rubbers, methyl phenylvinyl silicone rubbers), sulfur-containing rubbers (for example, polysulfide rubbers), fluoro rubbers (for example, vinylidene fluoride rubbers, fluorine-containing vinyl ether rubbers, tetrafluoro-ethylene propylene rubbers, fluorine-containing silicone rubbers, fluorine-containing phosphazen rubbers), thermoplastic elastomers (for example, styrene elastomers, polyolefin elastomers, polyester elastomers, polyurethane elastomers, polyamide elastomers), etc.

Note that as the elastomer component, halogen (for example, Br, Cr, I)-containing copolymer rubbers such as disclosed in Japanese Unexamined Patent Publication (Kokai) No. 5-508435 containing $C_4$ to $C_7$ iso-monoolefin and p-alkylenestyrene, having a content of p-alkylenestyrene of 5.5 to 25% by weight of the total copolymer rubber, preferably 6.0 to 20% by weight, a halogen content of not less than 1.0% by weight or more, preferably 1.0 to 5.0% by weight, and a Mooney viscosity $ML_{1+8}$ (125° C.) of 30 or more, preferably 35 to 70, may be used. The weight ratio of the component (A) and the component (B) in the case of use of this rubber is (A)/(B)= 10/90 to 90/10, preferably 15/85 to 85/15.

A content of p-alkylenestyrene of this copolymer rubber of less than 5.5% by weight is not desirable, since the resistance to air permeation of the resultant polymer composition for a tire is decreased, while the copolymer rubber having more than 25% by weight is not desirable, since the embrittlement tends to occur at low temperatures. Further, a halogen content of less than 1.0% by weight is not desirable, since the mechanical strength such as the tensile strength falls, while a Mooney viscosity of less than 30 is not desirable, since again the resistance to air permeation is decreased. Further, a compounding ratio of the component (A) and component (B) (based on weight) of less than 10/90 is not desirable since again the resistance to air permeation falls, while conversely one over 90/10 is not desirable since the flexibility is decreased.

Note that one example of such a copolymer rubber is sold commercially as EXXPRO from Exxon Chemical. For example, this is obtained by partially brominating a copolymer rubber of an isoprene and p-methylstyrene of the structure (A) shown below by $Br_2$ to obtain the copolymer rubber of the following structure (B). This may be suitably used in the present invention.

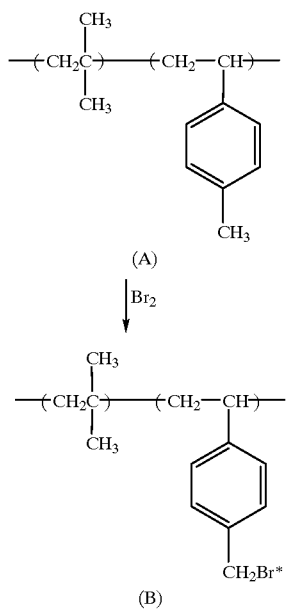

When the compatibilities of the above-mentioned specific thermoplastic resin and elastomer component are different, it is preferable to use a suitable agent for promoting compatibility as a third component so as to cause the two components to become compatible with each other. Mixing such a compatibility agent into the system enables the surface tension between the thermoplastic resin and the elastomer component to be lowered and, as a result, makes the rubber particles forming the dispersion layer smaller in size, so the characteristics of the two components are more effectively brought out. Examples of such a compatibility agent are a copolymer having the structure of one or both of the thermoplastic resin and elastomer component or one having the structure of a copolymer having a group reactable with the thermoplastic resin or elastomer component such as an epoxy group, carboxyl group, halogen group, amine group, oxazoline group, hydroxyl group, etc. These may be selected according to the type of the thermoplastic resin and elastomer component to be mixed in with, but normally use is made of a styrene/ethylene/butadiene-styrene block copolymer (SEBS) and its maleic acid modified products, EPDM, EPDM/stryene or EPDM/acrylonitrile graft copolymers and theirtmaleic acid modified products, styrene/maleate copolymers, reactive phenoxy resins, etc. The amount of the compatibility agent is not particularly limited, but preferably is 0.5 to 20 parts by weight based on 100 parts of the polymer component (total of thermoplastic resin and elastomer component).

The proportion of the specific thermoplastic resin (A) and elastomer component (B) may be suitably determined by the balance of the thickness of the film, the resistance to air permeation, and the flexibility, but a preferable range is, by weight ratio, 10/90 to 90/10, more preferably 20/80 to 85/15.

The polymer composition according to the present invention may have mixed into it, as a third component in addition to the polymer component of the above necessary components (A) and (B), another polymer such as the above compatibility agent polymer in a range not detracting from the required properties of the polymer composition for a tire of the present invention. The purpose of mixing in the other polymer is to improve the compatibility of the thermoplastic resin and the elastomer composition, to improve the film forming ability of the material, to improve the heat resistance, to reduce costs, etc. Examples of such materials used for these purposes are polyethylene (PE), polypropylene (PP), polystyrene (PS), ABS, SBS, and polycarbonate (PC). The polymer of the third component (C) is not particularly limited so long as the polymer composition has the predetermined values of the air permeation coefficient and Young's modulus.

The polymer composition according to the present invention, as explained above, includes as essential components the polymer components (A) and (B) having the specific air permeation coefficient and Young's modulus. This may be illustrated as in the graph of FIG. 1. In FIG. 1, the component (A) corresponds to the area X, the component (B) to the area Y, and the resultant polymer composition to the area Z.

In the present invention, the thermoplastic resins $A_1$ to $A_n$ belonging to the component (A) are determined (here, $A_1$ is expressed as ($A_{ix}$, $A_{iy}$) where the Young's modulus of the i-th thermoplastic resin is $A_{ix}$ and the air permeation coefficient is $A_{iy}$) and the average value Aav of the same (=$\Sigma \phi i$ ($A_{ix}$, $A_{iy}$) (i=1 to n), where $\phi i$ is the percentage by weight of Ai) is found. An elastomer is selected so that the average Bav (=$\Sigma \phi i$ ($B_{ix}$, $B_{iy}$) (i=1 to n), where $\phi$ is the percent by weight of Bi, $B_{ix}$, is the Young's modulus of the i-th elastomer component, and $B_{iy}$ is the air permeation coefficient of the i-th elastomer component) of the (B) components $B_1$ to $B_n$ falling in the area Y falls in the area S under the line obtained by extending outward the straight line AavP connecting the point Aav and the point P of the air permeation coefficient of $25 \times 10^{-12}$ cc·cm/cm²·sec·cmHg (at 30° C.) and the Young's modulus of 500 MPa and above the air permeation coefficient of $25 \times 10^{-12}$ cc·cm/cm²·sec·cmHg (at 30° C.). By mixing the component (A) and the component (B) in a suitable formulation, it is possible to obtain a polymer composition falling in the target area Z.

The pneumatic tire having the air permeation prevention layer produced using the polymer composition for a tire of the present invention will now be explained in further detail.

The air permeation prevention layer of the pneumatic tire according to the present invention may be arranged at any location inside the tire, that is, at the inside or outside of the carcass layer or at any other location. The point is that it be arranged so as to prevent the permeation and dispersion of air from the inside of the tire and enable the air pressure inside the tire to be held for a long period of time, whereby the object of the invention can be achieved.

Figure 2:
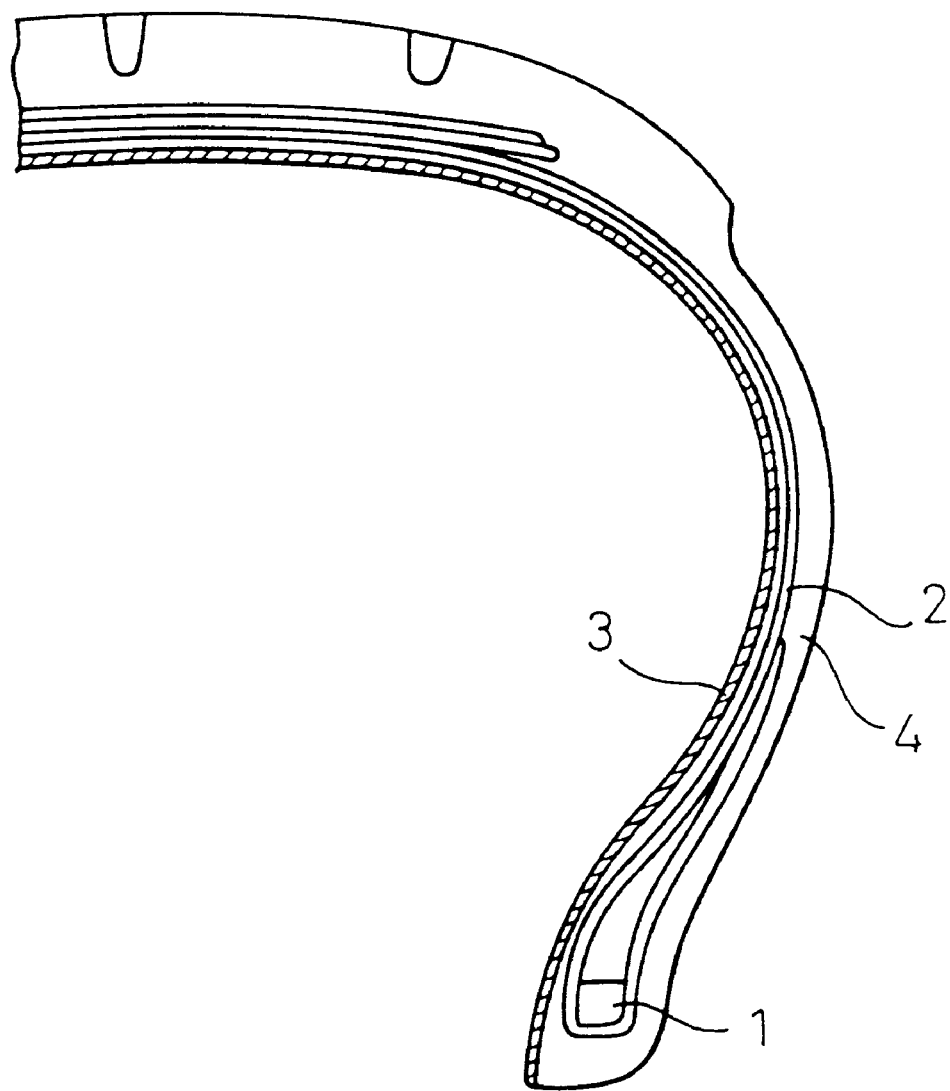
FIG. 2 is a semi-cross-sectional view along the meridian direction showing the structure of an inner liner portion of a pneumatic tire of the present invention.

FIG. 2 is a semi-cross-sectional view along the meridian direction illustrating a typical example of the arrangement of an air permeation prevention layer of a pneumatic tire. In FIG. 2, a carcass layer 2 spans between the left and right bead cores 1 and 1. On the tire inner surface at the inside of the carcass layer 2 is provided an inner liner layer 3. The inner liner layer 3 is comprised by the above-mentioned tire polymer composition in the present invention. In FIG. 2, 4 shows a sidewall.

The process of production of the polymer composition for making the air permeation prevention layer in the present invention consists of melting and kneading the thermoplastic resin and elastomer composition (unvulcanized in case of rubber) in advance by a bi-axial kneader and extruder to cause the elastomer component to disperse in the thermoplastic resin forming the continuous phase. When vulcanizing the elastomer composition, it is also possible to add the vulcanization agent while kneading and perform dynamic vulcanization of the elastomer composition. Further, the various blending agents (except vulcanization agent) for the thermoplastic resin or the elastomer composition may be added into the mix during the kneading, but it is desirable to premix them before the kneading. The kneader used for kneading the thermoplastic resin and the elastomer composition is not particularly limited. A screw extruder, kneader, Bambury mixer, bi-axial kneader and extruder, etc. may be mentioned. Among these, a bi-axial kneader and extruder is preferably used for kneading of the thermoplastic resin and elastomer composition and for dynamic vulcanization of the elastomer composition. Further, it is possible to use two or more types of kneaders and successively perform the kneading. The condition for the melt kneading is a temperature of at least the temperature where the thermoplastic resin melts. Further, a shear rate at the time of kneading of 1000 to 7500 $sec^{-1}$ is preferable. The overall kneading time is from 30 seconds to 10 minutes. Further, when a vulcanization agent is added, the vulcanication time after the addition is preferably 15 seconds to 5 minutes.

Note that the types of the vulcanization agents and the dynamic vulcanization conditions (i.e., temperature and time), etc. can be appropriately determined, depending upon the component (B) added and are not specifically limited.

As the vulcanization agent, any conventional rubber vulcanization agent (or crosslinking agent) can be used. Examples of typical sulfur based vulcanization agent are sulfur powder, precipitating sulfur, highly dispersible sulfur, surface treated sulfur, non-soluble sulfur, dimorforin disulfide, alkylphenol disulfide, etc. These vulcanization agent may be used in an amount of, for example, 0.5 to 4 phr (i.e., parts by weight per 100 parts by weight of rubber component (polymer) in the component B).

Examples of organic peroxide based vulcanization agent are benzoyl peroxide, t-butyl/hydroperoxide, 2,4-dichlorobenzoyl peroxide, 2,5-dimethyl-2,5-di(t-butylperoxy)hexane, 2,5-dimethylhexane-2,5-di(peroxyl benzoate), etc. and may be used in an amount of, for example, 1–15 phr.

Further, examples of phenol resin based vulcanization agent are brominated alkylphenol resins and mixed crosslinking system of halogen donor such as tin chloride, chloroprene, etc. and alkyl phenol resin in an amount of, for example, 1 to 20 phr.

As the other vulcanization agents, zinc oxide (about 5 phr), magnesium oxide (about 4 phr), litharge (about 10–20 phr), p-quinone dioxime, p-dibenzoylquinone dioxime, tetrachloro-p-benzoquinone, poly-p-dinitroso benzene (about 2–10 phr), methylene dianiline (0.2–10 phr).

Furthermore, vulcanization accelerators may be optionally added. Examples of such a vulcanization accelerator are conventional vulcanization accelerators such as aldehyde•ammonia type, quanidine type, thiazol type, sulfoneamide type, thiuram type, dithioacid salt type, thiourea type and these may be used in an amount of, for example, 0.5 to 2 phr.

As typical examples, hexamethylenetetramine etc. as the aldehydeeammonia type vulcanization accelerator; diphenylquanidine, etc. as the quanidine type vulcanization accelerator; dibenzothiazyl disulfide (DM), 2-mercapto benzothiazole and the Zn salt thereof, cyclohexylamine salts, etc. as the thiazole type vulcanization accelerator; cyclohexyl/benzothiazyl sulfonamide (CBS), N-oxydiethylene benzothiazyl-2-sulfenamide, N-t-butyl-2-benzothiazole sulfenamide, 2-(molpholinoldithio) benzothiazol, etc. as the sulfenamide type vulcanization accelerator; tetramethyl thiuramdisulfide (TMTD), tetraethyl thiuram disulfide, tetramethyl thiuram monosulfide (TMTM), dipentamethylene thiuram tetrasulfide, etc., as the thiuram type vulcanization accelerator; Zn-dimethyldithiocarbamate, Zn-diethyldithiocarbamate, Zn-di-n-butyldithiocarbamate, Zn-ethylphenyl dithiocarbamate, Te-diethyl/dithiocarbamate, Cu-dimethyl dithiocarbamate, Fe-dimethyl dithiocarbamate, pipecholine pipecholyl dithiocarbamate, etc. as the dithio acid salt type vulcanization accelerator, and ethylene thiourea, diethyl thiourea, etc. as the thiourea type vulcanization accelerator are exemplified.

The vulcanization accelerator may be used, together with conventional rubber additives such as zinc oxide (about 5 phr), stearic acid, oleic acid and these Zn salts (about 2–4 phr).

The polymer composition produced by the above-mentioned process is then formed into a film by extrusion or calendering. The method of forming the film may be the method for forming a film from an ordinary thermoplastic resin or thermoplastic elastomer.

The thin film thus obtained has a structure of the elastomer composition (B) dispersed as a discontinuous phase in a matrix of the thermoplastic resin (A). By adopting this state of a dispersed structure, it becomes possible to impart a balance of flexibility and resistance to air permeation and possible to obtain the effects of an improvement of the resistance to heat deformation, improvement of the water resistance, etc. Further, thermoplastic working becomes possible. Accordingly, formation of a film becomes possible by ordinary plastic molding machines, that is, extrusion or calendering. The method of forming the film need only be a method for forming a film from an ordinary thermoplastic resin or thermoplastic elastomer.

Regarding the production process of a pneumatic tire having an air permeation prevention layer comprised of a thin film of the polymer composition according to the present invention, as shown in FIG. 2, explaining the example of the case of arranging the inner liner layer 3 at the inside of the carcass layer 2, the polymer composition of the present invention is extruded to a thin film of a predetermined width and thickness by a resin extruder, then this is wrapped around a tire molding drum and joined to make a cylindrical shape. On top of this are then successively overlaid a carcass layer, a belt layer, a tread layer, and other members comprised of unvulcanized rubber used for the production of usual tires, then the drum is withdrawn to obtain a green tire. Next, this green tire is heated and vulcanized according to an ordinary method to make a desired light weight pneumatic tire. Note that the same type of process may be followed even when providing the air permeation prevention layer on the outer circumference of the carcass layer.

The material of the rubber layer for bonding with the air permeation prevention layer according to the present invention is not particularly limited. Any rubber material which has been generally used as a rubber material for a tire in the past may be used. Examples of such a rubber are rubber compositions comprised of diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The air permeation prevention layer according to the present invention has an air permeation coefficient of $25 \times 10^{-12}$ cc·cm/cm²·sec·cmHg (at 30° C.) or less, preferably $5 \times 10^{-12}$ cc·cm/cm²·sec·cmHg. There is no particular lower limit on the air permeation coefficient, but in practice it is $0.05 \times 10^{-12}$ cc·cm/cm²·sec·cmHg (at 30° C.) or less. By making the air permeation coefficient $25 \times 10^{-12}$ cc·cm/cm²·sec·cmHg (at 30° C.) or less, it is possible to make the thickness of the air permeation prevention layer ½ or less the thickness of the conventional air permeation prevention layer.

On the other hand, the Young's modulus is 1 to 500 MPa, preferably 10 to 300 MPa, and the thickness is 0.02 to 1.0 mm, preferably 0.05 to 0.5 mm. When the Young's modulus is less than 1 MPa, then wrinkles will form at the time of forming the tire, whereby handling will become difficult, while when more than 500 MPa, it is not possible for the film to follow the deformation of the tire during use.

According to the second aspect of the present invention, in addition to the above first and second components (A) and (B), a third component for imparting bondability comprised of a thermoplastic resin having a critical surface tension difference ($\Delta \gamma c$) with the facing rubber layer at the time of use as a tire of not more than 3 mN/m is mixed into the composition in an amount of 3 to 70% by weight, preferably 3 to 50% by weight, based on the total weight of the components (A), (B), and (C). When the amount compounded is too small, the bonding with the facing component becomes insufficient, while conversely if too great, the air permeation coefficient becomes too large and the elasticity becomes too high, making this impractical.

Specific examples of the thermoplastic resin of the third component (C) according to the second aspect of the present invention are an ultra high molecular weight polyethylene (UHMWPE) having a molecular weight of 1,000,000 or more, preferably 3,000,000 or more, ethylene-ethylacetate copolymer (EEA), ethylene-acrylate copolymer (EAA), ethylene-methylacrylate resin (EMA), and other acrylate copolymers and the maleic acid addition products thereof, polypropylene (PP), styrene-butadiene-styrene block copolymer (SBS), styrene-ethylene-butadiene-styrene block copolymer (SEBS), polyethylene (PE), ethylene-propylene copolymer (EP), etc.

The proportion of the total weight of the specific thermoplastic resin components (A) and (C) and the elastomer component (B) is suitably determined by the balance of the thickness of the film, the resistance to air permeation, and the flexibility, but the preferable range is 10/90 to 90/10, more preferably 20/80 to 85/15.

The polymer composition according to the present invention, as explained above, includes as essential components the polymer components (A), (B), and (C) having the specific air permeation coefficient and Young's modulus. This may be illustrated as in the graph of FIG. 1. In FIG. 1, the component (A) corresponds to the area X, the component (B) to the area Y, and the resultant polymer composition to the area Z. The component (C) is determined based on having a critical surface tension difference with the facing rubber layer of not more than 3 mN/m.

In the present invention, the thermoplastic resins $A^1$ to $A^n$ belonging to the component (A) are determined and the average value Aav of the same ($=\Sigma \phi i (A_{ix}, A_{iY})$) (i=1 to n), where $\phi i$ is the percentage by weight of Ai) is found. An elastomer is selected so that the average Bav ($=\Sigma \phi i$ (i=1 to n), where $\phi i$ is the percent by weight of Bi) of the (B) components $B_1$ to $B_n$ falling in the area Y falls in the area S under the line obtained by extending outward the straight line AavP connecting the point Aav and the point P of the air permeation coefficient of $25 \times 10^{-12}$ cc·cm/cm²·sec·cmHg (at 30° C.) and the Young's modulus of 500 MPa and above the air permeation coefficient of $25 \times 10^{-12}$ cc·cm/cm²·sec·cmHg (at 30° C.). By mixing these in a suitable formulation and further adding the component (C), it is possible to obtain a polymer composition falling in the target area Z.

The pneumatic tire having the air permeation prevention layer produced using the polymer composition for a tire of the second aspect of the present invention will now be explained in further detail.

The production process of the polymer composition for making the air permeation prevention layer in the present invention comprises melting and kneading the thermoplastic resin component constituted by the components (A) and (C) and the elastomer (unvulcanized in case of rubber) component (B) in advance by a bi-axial kneader and extruder to cause the elastomer component to disperse in the thermoplastic resin forming the continuous phase. When vulcanizing the elastomer component, it is also possible to add the vulcanization agent while kneading and perform dynamic vulcanization of the elastomer component. Further, the various blending agents (except vulcanization agent) for the thermoplastic resin or the elastomer component may be added into the mix during the kneading, but it is desirable to premix them before the kneading. The kneader used for kneading the thermoplastic resin and the elastomer is not particularly limited. A screw extruder, kneader, Bambury mixer, bi-axial kneader and extruder, etc. may be mentioned. Among these, a bi-axial kneader and extruder is preferably used for kneading of a resin component and a rubber component and for dynamic vulcanization of a rubber component. Further, it is possible to use two or more types of kneaders and successively perform the kneading. The condition for the melt kneading is a temperature of at least the temperature where the thermoplastic resin melts. Further, a shear rate at the time of kneading of 2500 to 7500 sec⁻¹ is preferable. The overall kneading time is from 30 seconds to 10 minutes. Further, when a vulcanization agent is added, the vulcanication time after the addition is preferably 15 seconds to 5 minutes. The polymer composition produced by the above-mentioned process is then formed into a film by extrusion or calendering. The method of forming the film may be the method for forming a film from an ordinary thermoplastic resin or thermoplastic elastomer.

The thin film thus obtained has a structure of at least part of the elastomer component (B) dispersed, as a discontinuous phase, in a matrix of the thermoplastic resins (A) and (C).

By adopting this state of a dispersed structure, it becomes possible to impart a balance between the flexibility and the resistance to air permeation and possible to obtain the effects of an improvement of the resistance to heat deformation, improvement of the water resistance, etc. Further, thermoplastic processing becomes possible. Accordingly, a film formation becomes possible by ordinary plastic molding machines, that is, extrusion or calendering. The method of forming the film can be a method for forming a film from an ordinary thermoplastic resin or thermoplastic elastomer.

Regarding the production process of a pneumatic tire having an air permeation prevention layer comprised of a thin film of the polymer composition according to the second aspect of the present invention, as shown in FIG. 2, explaining the example of the case of arranging the inner liner layer 3 at the inside of the carcass layer 2, the polymer composition of the present invention is extruded to a thin film of a predetermined width and thickness by a resin extruder, then this is wrapped around a tire molding drum and joined to make a cylindrical shape. On top of this are then successively superposed a carcass layer, a belt layer, a tread layer, and other members including unvulcanized rubber used for the production of usual tires, then the drum is withdrawn to obtain a green tire. Next, this green tire is heated and vulcanized in accordance with an ordinary method to make a desired light weight pneumatic tire. Note that the same type of process may be followed even when providing the air permeation prevention layer on the outer circumference of the carcass layer.

The material of the rubber layer for facing with the air permeation prevention layer according to the present invention is not particularly limited. Any rubber material which has been generally used, as a rubber material for a tire in the past, may be used. Examples of such a rubber are rubber compositions including diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The air permeation prevention layer according to the present invention has an air permeation coefficient of $25 \times 10^{-12}$ cc·cm/cm$^2$·sec·cmHg (at 30° C.) or less, preferably $5 \times 10^{-12}$ cc·cm/cm$^2$·sec·cmHg (at 30° C.) or less. By making the air permeation coefficient of $25 \times 10^{-12}$ cc·cm/cm$^2$·sec·cmHg (at 30° C.) or less, it is possible to make the thickness of the air permeation prevention layer of ½ or less of the thickness of the conventional air permeation prevention layer.

On the other hand, the Young's modulus is 1 to 500 MPa, preferably 10 to 300 MPa, and the thickness is 0.02 to 1.0 mm, preferably 0.05 to 0.5 mm. When the Young's modulus is less than 1 MPa, then wrinkles will form at the time of forming the tire, whereby handling will become difficult, while when more than 500 MPa, it is not possible for the film to follow the deformation of the tire during use.

According to the third aspect of the present invention, in addition to the above components (A) and (B), a third component (D) for imparting bondability composed of another thermoplastic resin having a melting point of the vulcanization temperature or less, preferably 230° C. or less, is mixed into the thermoplastic resin of the component (A) in an amount of 3 to 50% by weight, preferably 5 to 35% by weight, based on the 100 parts by weight of the total components. When the amount compounded is too small, the attachment and bonding by the heat of vulcanization with the polymer composition film after the vulcanization of the green tire become insufficient and the joined portions become opened, which is inconvenient, in terms of durability, while conversely when too large, the molding of the tire becomes difficult due to the fluidity of the thermoplastic resin or it becomes difficult to maintain uniformity in the thickness of the film due to flow during vulcanization.

Specific examples of the thermoplastic resin of the third component (D) according to the third aspect of the present invention are of an ultra high molecular weight polyethylene (UHMWPE) with a weight average molecular weight of at least 1,000,000, preferably at least 3,000,000, ethylene-acrylester copolymer (EEA), ethylene-methylacrylate resin (EMA), ethylene-acrylate copolymer (EAA), and other acrylate copolymers and the maleic acid addition products thereof, multiple copolymer polyamide resins (PA), ethylene-vinyl acetate copolymer (EVA), etc. Here, the multiple copolymer polyamide resins mean two nylons of a specific copolymerization ratio, for example, nylon 6/ nylon 66 (for example, copolymerization ratio of 70/30 to 50/50) and further a three, four, or higher component copolymer polyamide such as nylon 6/ nylon 66/nylon 610, nylon 6/ nylon 66/ nylon 12, nylon 6/ nylon 66/nylon 610/nylon 12, etc. These multiple copolymer polyamide resins may be used alone or together. These multiple copolymer polyamide resins are commercially available, for example, as Toray's CM4000, CM4001, CM8000, etc. In addition, polypropylene (PP), ethylene-propylene copolymer (EP), styrene-ethylene-butadiene-styrene block copolymer (SEBS), styrene-butadiene-styrene block copolymer (SBS), styrene-isobutylene-styrene copolymer (SIBS), etc. can be exemplified.

The polymer composition according to the third aspect of the present invention may further have blended therein the above specific thermoplastic resin (D), but the resultant polymer composition must have the specified air permeation coefficient and Young's modulus.

When bonding the tire polymer composition according to the third aspect of the present invention with rubber, it is of course possible to treat the surface of the rubber by a halogen compound or to use the chlorinated rubber type, isocyanate type, or phenol resin type adhesive, but in the present invention, it is also possible to add the third component (D) of another thermoplastic resin and make joint use of a material, which is generally called a compatibility agent so as to strengthen the bonding power with the rubber. As the compatibility agent, one which functions by the action of bringing together the surface energies of the layers may be used or one which has reactive functional groups may be used. As the reactive group, use is suitably made of the carboxyl group, halogen group, hydroxyl group, amine group, epoxy group, etc. As the main compatibility agents, mention may be made of maleic acid modified polyolefin, polymers comprised of a polyolefin to which acrylate or glycidylmethacrylate has been graft polymerized, block copolymers of polyolefins and nylon, and maleic acid modified products of a styrene-ethylene-butadiene-styrene copolymer.

The pneumatic tire having the air permeation prevention layer produced using the polymer composition for a tire of the third aspect of the present invention will be explained in further detail.

The production process of the polymer composition for making the air permeation prevention layer in the present invention comprises melting and kneading the thermoplastic resins (A) and (D) and the elastomer (unvulcanized in case of rubber) component (B) in advance by a bi-axial kneader and extruder to cause the elastomer component to disperse in the thermoplastic resin forming the continuous phase. Further, it is possible to melt and knead (A) and (B), then add (D) and obtain a similar structure. When vulcanizing the elastomer component, it is also possible to add the vulcanization agent while kneading and perform dynamic vulcanization of the elastomer component. Further, the various blending agents (except vulcanization agent) for the thermoplastic resin or the elastomer component may be added into the mix during the kneading, but it is desirable to premix them before the kneading. The kneader used for kneading the thermoplastic resin and the elastomer is not particularly limited. A screw extruder, kneader, Bambury mixer, bi-axial kneader and extruder, etc. may be mentioned. Among these, a bi-axial kneader and extruder is preferably used for kneading of a resin component and a rubber component and for dynamic vulcanization of a rubber component. Further, it is possible to use two or more types of kneaders and successively perform the kneading. The condition for the melt kneading is a temperature of at least the temperature where the thermoplastic resin melts. Further, a shear rate at the time of kneading of 2500 to 7500 $sec^{-1}$ is preferable. The overall kneading time is from 30 seconds to 10 minutes. Further, when a vulcanization agent is added, the vulcanication time after the addition is preferably 15 seconds to 5 minutes. The polymer composition produced by the above process is then extruded into strands by a bi-axial kneader and extruder which are then pelletized by a resin pelletizer, then the pellets are used for sheeting or calendering by a resin extruder to form a film. The method of forming the film may be the method for forming a film from an ordinary thermoplastic resin or thermoplastic elastomer.

The thin film thus obtained has a structure of at least part of the elastomer component (B) dispersed as a discontinuous phase in a matrix of the thermoplastic resins (A) and (D). By adopting this state of a dispersed structure, it becomes possible to impart a balance between flexibility and resistance to air permeation and possible to obtain the effects of an improvement of the resistance to heat deformation, improvement of the water resistance, etc. Further, thermoplastic working becomes possible. Accordingly, formation of a film becomes possible by ordinary plastic molding machines, that is, extrusion or calendering. The method of forming the film can be a method for forming a film from an ordinary thermoplastic resin or thermoplastic elastomer.

Regarding the production process of a pneumatic tire having an air permeation prevention layer comprising a thin film of the polymer composition according to the third aspect of the present invention, as shown in FIG. 2, explaining the example of the case of arranging the inner liner layer 3 at the inside of the carcass layer 2, the polymer composition of the present invention is extruded to a thin film of a predetermined width and thickness by a resin extruder, then this is wrapped around a tire molding drum and joined to make a cylindrical shape. On top of this are then successively overlaid a carcass layer, a belt layer, a tread layer, and other members comprised of unvulcanized rubber used for the production of usual tires, then the drum is withdrawn to obtain a green tire. Next, this green tire is heated and vulcanized in accordance with an ordinary method at, for example, 150° C. to 230° C. to make a desired light weight pneumatic tire. Note that the same type of process may be followed even when providing the air permeation prevention layer on the outer circumference of the carcass layer.

The material of the rubber layer for facing the air permeation prevention layer according to the present invention is not particularly limited. Any rubber material which has been generally used as a rubber material for a tire in the past may be used. Examples of such a rubber are rubber compositions including diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The air permeation prevention layer according to the present invention has an air permeation coefficient of $25 \times 10^{-12}$ cc·cm/cm²·sec·cmHg (at 30° C.) or less, preferably $5 \times 10^{-12}$ cc·cm/cm²·sec·cmHg (at 30° C.) or less. By making the air permeation coefficient $25 \times 10^{-12}$ cc·cm/cm²·sec·cmHg (at 30° C.) or less, it is possible to make the thickness of the air permeation prevention layer ½ or less of the thickness of the conventional air permeation prevention layer.

On the other hand, the Young's modulus is 1 to 500 MPa, preferably 10 to 300 MPa, and the thickness is 0.02 to 1.0 mm, preferably 0.05 to 0.5 mm. When the Young's modulus is less than 1 MPa, then wrinkles will form at the time of forming the tire, whereby handling will become difficult, while when more than 500 MPa, it is not possible for the film to follow-the deformation of the tire during use.

According to the third aspect of the present invention, in addition to the polymer component of the above essential components (A) and (B), it is also possible to blend, as the third component (E), to an extent not detracting from the required properties of the polymer composition for a tire of the present invention a compatibility agent or other polymer and blending agents. The purpose of blending another polymer is to improve the compatibility of the thermoplastic resin component and a rubber component, to improve the film forming ability of the material, to improve the heat resistance, to reduce costs, etc. Examples of materials used for these purposes are polyethylene, polypropylene, polystyrene, ABS, SBS, and polycarbonate (PC). The polymer of the third component (E) is not particularly limited so long as the polymer composition has the predetermined values of the air permeation coefficient and Young's modulus.

Even when the critical surface tension difference between the air permeation prevention layer and the bondability imparting layer is more than 3 mN/m, by suitably selecting the compatibility agent, it is possible to adjust the bonding. As such a compatibility agent, mention may be made of maleic acid modified polyolefins, polymers composed of a polyolefin to which acrylate or glycidylmethacrylate has been graft polymerized, block copolymers of polyolefins and nylon, and maleic acid modified products of a styrene-ethylene-butadiene-styrene copolymer.

According to the fourth aspect of the present invention, as a bondability imparting layer for improving the bonding with the facing layer at least at one surface of the air permeation prevention layer, a thin film of a thermoplastic resin different from the thermoplastic resin (A) and having a critical surface tension difference with the layer facing the air permeation prevention layer of 3 mN/m or less or a critical surface tension difference ($\Delta c$) with the two layers of 3 mN/m or less is used. The thickness is not particularly limited, but the preferable thickness is 250 $\mu$m or less.

By doing this, there is an entanglement action of the thermoplastic resin with the facing layers during vulcanization, and therefore the bonding is achieved.

Specific examples of the bonding polymer constituting the bondability imparting layer having the specified critical surface tension difference according to the present invention are an ultra high molecular weight polyethylene (UHMWPE) with a weight average molecular weight of at least 1,000,000, preferably at least 3,000,000, ethylene-ethylacrylate copolymer (EEA), ethylene-methylacrylate resin (EMA), ethylene-acrylate copolymer (EAA), and other acrylate copolymers and the maleic acid addition products thereof, polypropylene (PP) and its maleic acid modified products, ethylene-propylene copolymer (EP) and its maleic acid modified products, polybutadiene resins and their anhydrous maleic acid modified products, styrene-butadiene-styrene block copolymer (SBS), styrene-ethylene-butadiene-styrene block copolymer (SEBS), fluorine type thermoplastic resins, polyester type thermoplastic resins, and compositions containing these thermoplastic resins (for example, these may be contained in the thermoplastic resin (A) and elastomer component (B) of the present invention), etc. These may be extruded by ordinary methods using for example a resin extruder to form sheets.

The thickness of the bondability imparting layer is not particularly limited, but it is better that the thickness be smaller so as to reduce the tire weight and therefore 5 μm to 150 μm is preferable.

The proportion of the specific thermoplastic resin (A) and elastomer component (B) may be suitably determined depending upon the balance between the thickness of the film, the resistance to air permeation, and the flexibility, but a preferable range is, by weight ratio, 10/90 to 90/10, more preferably 20/80 to 85/15.

The process of production of the polymer composition for making the air permeation prevention layer in the fourth aspect of the present invention consists of melting and kneading the thermoplastic resin and the elastomer (unvulcanized in case of rubber) in advance by a bi-axial kneader and extruder to cause the elastomer component to disperse in the thermoplastic resin forming the continuous phase. When vulcanizing the elastomer component, it is also possible to add the vulcanization agent while kneading and perform dynamic vulcanization of the elastomer component. Further, the various blending agents (except vulcanization agent) for the thermoplastic resin or the elastomer component may be added into the mix during the kneading, but it is desirable to premix them before the kneading. The kneader usable for kneading the thermoplastic resin and the elastomer is not particularly limited. A screw extruder, kneader, Bambury mixer, bi-axial kneader and extruder, etc. may be exemplified. Among these, a bi-axial kneader and extruder is preferably used for kneading of a resin component and rubber component and for dynamic vulcanization of a rubber component. Further, it is possible to use two or more types of kneaders and successively perform the kneading. The condition for the melt kneading is a temperature of at least the temperature where the thermoplastic resin melts. Further, a shear rate at the time of kneading of 2500 to 7500 $sec^{-1}$ is preferable. The overall kneading time is from 30 seconds to 10 minutes. Further, when a vulcanization agent is added, the vulcanication time after the addition is preferably 15 seconds to 5 minutes. The polymer composition produced by the above process is formed into a film by extrusion or calendering by a resin extruder to form a film. The method of forming the film may be the method for forming a film from an ordinary thermoplastic resin or thermoplastic elastomer.

The thin film thus obtained has a structure of at least part of the elastomer component (B) dispersed as a discontinuous phase in a matrix of the thermoplastic resin (A).

By adopting this state of a dispersed structure, it becomes possible to impart a balance between flexibility and resistance to air permeation and possible to obtain the effects of an improvement of the resistance to heat deformation, improvement of the water resistance, etc. Further, thermoplastic working becomes possible. Accordingly, formation of a film becomes possible by ordinary plastic molding machines, that is, extrusion or calendering. The method of forming the film need only be a method for forming a film from an ordinary thermoplastic resin or thermoplastic elastomer.

This bondability imparting layer may be kneaded and extruded into a film in the same way as the above composition. When a single composition, it may be formed into a film as it is by a resin extruder and may be positioned between the air permeation prevention layer and the layer facing at least one surface of the same.

As another mode of the process of formation of the air permeation prevention layer and bondability imparting layer, it is possible to use separate resin extruders for the air permeation prevention layer composition and the bondability imparting layer composition, simultaneously extrude them, and provide a common sheeting die at the front ends of the two extruders to prepare multiple layer films to thereby obtain a prebonded double-layer film for use as a sheet for molding tires.

Regarding the production process of a pneumatic tire having an air permeation prevention layer comprising a thin film of the polymer composition according to the present invention, as shown in FIG. 2, explaining the example of the case of arranging the inner liner layer 3 at the inside of the carcass layer 2, the polymer composition constituting the air permeation prevention layer of the present invention and the polymer or polymer composition constituting the bondability imparting layer are extruded to a thin film of a predetermined width and thickness, then this is wrapped around a tire molding drum. On top of this are then successively overlaid a carcass layer, a belt layer, a tread layer, and other members comprised of unvulcanized rubber used for the production of usual tires, then the drum is withdrawn. Next, this green tire is heated and vulcanized in accordance with an ordinary method to make a desired light weight pneumatic tire. Note that the same type of process may be followed even when providing the air permeation prevention layer on the outer circumference of the carcass layer.

The material of the rubber layer for facing with the air permeation prevention layer according to the present invention is not particularly limited. Any rubber material which has been generally used as a rubber material for a tire in the past may be used. Examples of such a rubber are rubber compositions including diene rubbers such as NR, IR, BR, and SBR, halogenated butyl rubbers, ethylene-propylene copolymer rubbers, styrene elastomers, etc. to which have been added blending agents such as carbon black, process oil, and vulcanization agents.

The air permeation prevention layer according to the present invention has an air permeation coefficient of $25 \times 10^{-12}$ cc·cm/cm²·sec·cmHg (at 30° C.) or less, preferably $5 \times 10^{-12}$ cc·cm/cm²·sec·cmHg (at 30° C.) or less. By making the air permeation coefficient $25 \times 10^{-12}$ cc·cm/cm²·sec·cmHg (at 30° C.) or less, it is possible to make the thickness of the air permeation prevention layer ½ or less of the thickness of the conventional air permeation prevention layer.

On the other hand, the Young's modulus is 1 to 500 MPa, preferably 10 to 300 MPa, and the thickness is 0.02 to 1.0 mm, preferably 0.05 to 0.5 mm. When the Young's modulus is less than 1 MPa, wrinkles will form at the time of forming the tire, whereby the handling will become difficult, while when more than 500 MPa, it is not possible for the film to follow the deformation of the tire during use.

EXAMPLES

The present invention will now be further illustrated by, but is by no means limited to, the following Examples.

METHOD OF MEASUREMENT OF AIR PERMEATION COEFFICIENT OF FILM

According to JIS K7126 "Test Method of Gas Permeability of Plastic Films and Sheets (Method A)".

Test piece: Samples of films prepared in the Examples used.

Test gas: Air ($N_2$:$O_2$=8:2)

Test temperature: 30° C.

METHOD OF MEASUREMENT OF YOUNG'S MODULUS OF FILM

According to JIS K6251 "Tensile Test Method of Vulcanized Rubber".

Test piece: The compositions prepared in the Examples were punched into JIS No. 3 dumbbell shapes in parallel to the direction of flow of the resin during the extrusion of the films. A tangent was drawn to the curve of the initial strain area of the resultant stress-strain curve and the Young's modulus was found from the inclination of the tangent.

Tire Air Leakage Performance Test Method

A 165SR13 steel radial tire (rim 13×41/2-J) was used, allowed to stand at an initial pressure of 200 kPa under no-load conditions at room temperature 21° C. for 3 months, and measured as to pressure every four day interval.

When the measured pressure is Pt, the initial pressure is Po, and the number of days elapsed is t, the value $\alpha$ is found by recurrence of the function:

$$Pt/Po=\exp(-\alpha t)$$

The obtained $\alpha$ is used and t=30 substituted in the following formula to obtain $\beta$:

$$\beta=[1-\exp(-\alpha t)]\times 100$$

This value $\beta$ is considered the rate of reduction of pressure per month (%/month).

Method of Evaluation of Melt-Fusing With Rubber

Two mm sheets of various resins were pressed by a hot press at a pressure of 3 MPa for 20 minutes. The temperature at that time was made the melting points of the resins plus 20° C. The sheets were subjected to peeling tests in widths of 1 inch in accordance with JIS K6256 and the ones where the materials were destroyed were indicated by an O mark and the ones where no peeling force at all was required were indicated by an X mark. Ones where a peeling force was required, but there was separation at the interface were indicated by $\Delta$ marks. The rubber used at that time was SBR/NR of 50:50 parts with a $\gamma c$ of 30 mN/m.

Tire Durability Test Method (Test Method of Durability of Inner Liner Layer)

A 165SR13 steel radial tire (rim 13×41/2-J) was used and tested under conditions of an air pressure of 140 kPa and a load of 5.5 kN at room temperature (38° C.) on a $\phi$1707 mm drum at a speed of 80 km/h for 10,000 km, then the inner surface of the tire was inspected. The inner liner layer was visually inspected and those where the following trouble were found were judged as defective (X):

1) Splits and cracks
2) Peeling and blistering

Method of Measurement of Melting Point

Pellets of the various resins were measured by differential scan calorimetry (DSC) and the endothermic peaks were determined as the melting points. When the endothermic peaks of the melting points were unclear, the heat deformation temperature was measured by a thermal mechanical analysis (TMA) apparatus by applying a load of 1 g on a test piece of 5×5×15 mm and this was used as a reference value for the DSC data. The rate of temperature rise was made 10° C./min.

Measurement of Weight of Air Permeation Prevention Layer

Pellets were melted by a resin extruder and films of a width of 350 mm and a thickness of 0.05 mm were prepared and their weights measured.

Rate of Fall of Internal Pressure

The films of the formulations of the examples were used for inner liners which were attached to rims of size 13×41/2-J, then air leakage tests were run and the results used as the rate of fall of internal pressure inside the tires.

Durability

To view the effect of melt-fusion at 40 mm splices provided at the inner liner layer, a splice durability test was performed using a size 165SR13 steel radial tire (rim 13×41/2-J) prepared under conditions of a vulcanization temperature of 185° C. and a pressure of 2.3 MPa and running it under test conditions (air pressure of 140 kPa, load of 5.5 kN, and room temperature 38° C.) on a $\phi$1707 mm drum at a speed of 80 km/h for 10,000 km. The splice portion of the tire inner liner layer was visually inspected and tires found to have the following problems were deemed defective:

1) openings at joins
2) Peeling or blisters at or near joins

Retention of Sheet Shape

The shape retention of the sheet itself during vulcanication of the tire was evaluated as follows based on the stability of thickness of the inner liner of the tire after vulcanization.

A liner of a thickness of 0.05 mm was laid on the surface of a carcass layer (carcass cord: 1500 d/2, PET count density: 50 end/50 mm width, thickness: 1.0 mm), this was hot pressed (2300 kPa, 185° C.×15 minutes), the gauge of the inner liner of the vulcanized sample was measured, and the stability of thickness of the inner linerr was found from the maximum value (Tmax) and minimum value (Tmin) by the following formula:

$$[(Tmax-Tmin)/((Tmax+Tmin)/2)]$$

The value is preferably not more than 0.2.

Note that stability of thickness of the inner liner is essential from the following viewpoints:

1) If nonuniform, air would easily leak from the thin portions, and therefore, the resistance to air leakage would become poor.
2) Unevenness of the tire vulcanization bladder or carcass cord would cause unevenness if the fluidity of the liner material were high at the time of vulcanization.
3) If there is a large variation in the liner gauge, the resistance to air leakage could be maintained by increasing the initial thickness by that amount, but there would be no meaning to increasing the gauge over 20% from the standpoint of costs and the desired reduction of weight.

Examples I

The brands and basic physical properties of the polymers used in the Examples and Comparative Examples listed below are shown in Table I-1. Here, regarding the basic physical properties of the rubbers in the elastomer components, there are materials which cannot retain any shape in their original form alone and therefore are difficult to measure, so the values of the formulations of Table I-2 which have been vulcanized are used as typical properties. Futher, the brands of the blending agents are shown in Table I-3.

TABLE I-1

| Component | Material | Tradename | Manufacturer | Air permeation coefficient ($\times 10^{-12}$ cc·cc/cm²·s·cmHg) | Young's modulus (MPa) |
|---|---|---|---|---|---|
| Component A | N11 | Rirusan BESNO TL | Atochem | 11.0 | 560 |
| | N6 | CM 4061 | Torsy | 0.42 | 795 |
| | EVOH | Eval EPE153B | Kuraray | 0.052 | 1020 |
| | MXD6 | Reny 6002 | Mitsubishi Gas Chemical | 0.019 | 1550 |
| | PBT | Ultradur B4550 | BASF | 0.82 | 2650 |
| | AS | Sevian 500 | Daicel Chemical Industries | 6.71 | 2600 |
| | Cellulose acetate | Aceti 10 | Daicel Chemical Industries | 0.16 | 2800 |
| | PVDF | KF Polymer 1000 | Kureha Chemical Industry | 1.16 | 1100 |
| | PI | New-TP1450 | Mitsui Tostsu | 0.015 | 3000 |
| | N6/66 | Ultramid C35 | BASF | 0.51 | 1000 |
| Component B | SBR | Nipol 1502 | Nippon Zeon | 3100 | 4.2 |
| | M-EPM | Tafmer MP0610 | Mitsui Petrochemical Industries | 2900 | 7.2 |
| | Br-IIR | Exxon Bromobutyl 2244 | Exxon Chemical | 55 | 10.5 |
| | Br-IPMS | EXXPRO90-10 | Exxon Chemical | 50 | 12.0 |
| | Polyester elastomer | Hytrel 5577 | Toray-Dupont | 38.0 | 450.0 |
| | Polyamide elastomer | PEBAX4033 | Atochem | 3710.0 | 78.0 |
| | CHR | HERCLOR C | Hercules | 30.0 | 5.5 |
| | NBR | Nipol 1043 | Nippon Zeon | 110.0 | 8.3 |
| | CM | ELASLEN 301A | Showa Denko | 36.0 | 8.0 |
| | M-CM | ELASLEN Super G107 | Showa Denko | 42.0 | 7.7 |
| Component C | PC | Novarex 7022A | Mitsubishi Chemical | 76.1 | 2460 |

TABLE I-2

Vulcanization Systems of Various Elastomers

| | A | B | C | D | E | F | G | H |
|---|---|---|---|---|---|---|---|---|
| SBR | 100 | — | — | — | — | — | — | — |
| Br-IIR | — | 100 | — | — | — | — | — | — |
| NBR | — | — | 100 | — | — | — | — | — |
| Br-IPMS | — | — | — | 100 | — | — | — | — |
| CHR | — | — | — | — | 100 | — | — | — |
| CM | — | — | — | — | — | 100 | — | — |
| M-CM | — | — | — | — | — | — | 100 | — |
| M-EPM | — | — | — | — | — | — | — | 100 |
| HAF | 30 | 30 | 30 | 30 | 30 | 30 | 30 | 30 |
| ZnO | 3 | 3 | 3 | 1 | — | — | — | — |
| Sulfur | 2 | 2 | 2 | — | — | — | — | — |
| Trimercaptotriazine | — | — | — | — | 1.5 | 1.5 | 1.5 | — |
| Methylene dianiline | — | — | — | — | — | — | — | 0.6 |
| DM | 1 | 1 | 1 | — | — | — | — | — |
| MDCA | — | — | — | — | 1.5 | 1.5 | 1.5 | — |
| Stearic acid | 1 | 1 | 1 | 1 | — | — | — | — |
| Zinc stearate | — | — | — | 2 | — | — | — | — |

TABLE I-3

Brands of Various Blending Agents

| Material | Tradename | Manufacturer |
|---|---|---|
| ZnO | Zinc White No. 3 | Seido Chemical Industry |
| MgO | Kyowa Mag 150 | Kyowa Kagaku |
| Sulfur | Powdered sulfur | Karuizawa Seirensho |
| Trimercapto triazine | ZISNET-F | Sankyo Chemical |
| Methylene dianiline | Sumicure-M | Sumitomo Chemical |
| DM | Nocceler-DM | Ouchi Shinko Chemical Industrial |
| TT | Nocceler-TT | Ouchi Shinko Chemical Industrial |
| CZ | Nocceler-CZ | Ouchi Shinko Chemical Industrial |
| MDCA | 2-mercaptobenzothiazole dicyclohexyl amine salt | Ouchi Shinko Chemical Industrial |
| Zinc stearate | Zinc strarate | Seido Chemical Industry |
| Stearic acid | Bis-stearyl acid NY | Nippon Yushi |
| Petroleum based hydrocarbon resin | ESCOREZ 1102 | Esso |
| Paraffinic process oil | Machine Oil 22 | Showa Shell Sekiyu |
| GPF | Seast V | Tokai Carbon |
| HAF | Seast N | Tokai Carbon |
| Caprolactam | E-aminocaprolactam | Ube Industries |

Examples I-1 to I-8

One or two types of the various thermoplastic resin components (A), the elastomer components (B), and, in some cases, vulcanization agents, lubricants, or other components were kneaded in the various formulations (parts by weight) shown in Table I-4 to Table I-11 by a bi-axial kneader, pelletized, then formed into films of a width of 350 mm and a thickness of 0.1 mm by an extruder.

The air permeation coefficient and Young's modulus of the resultant films were measured. The results are shown in Table I-4 to Table II 11.

TABLE I-4

Example I-1

| Formulation no. | 1 | 2* | 3* | 4* | 5 | 6 | 7* | 8* | 9* | 10 |
|---|---|---|---|---|---|---|---|---|---|---|
| N6 | 90 | 80 | 50 | 20 | 10 | — | — | — | — | — |
| EVOH | — | — | — | — | — | 90 | 80 | 50 | 20 | 10 |
| MXD6 | — | — | — | — | — | — | — | — | — | — |
| Br-IPMS | 10 | 20 | 50 | 80 | 90 | 10 | 20 | 50 | 80 | 90 |
| Air permeation coefficient ($\times 10^{-12}$ cc·cm/cm²·s·cmHg) (at 30° C.) | 0.67 | 1.09 | 4.58 | 19.22 | 31.00 | 0.11 | 0.23 | 1.73 | 13.03 | 25.52 |
| Young's modulus (MPa) | 523 | 344 | 98 | 28 | 18 | 654 | 419 | 111 | 29 | 19 |

| Formulation no. | 11 | 12* | 13* | 14* | 15 | 16* | 17* | 18* |
|---|---|---|---|---|---|---|---|---|
| N6 | — | — | — | — | 34 | 32 | 20 | 4 |
| EVOH | — | — | — | — | — | — | — | — |
| MXD6 | 80 | 75 | 50 | 10 | 51 | 48 | 30 | 6 |
| Br-IPMS | 20 | 25 | 50 | 90 | 15 | 20 | 50 | 90 |
| Air permeation coefficient ($\times 10^{-12}$ cc·cm/cm²·s·cmHg) (at 30° C.) | 0.06 | 0.08 | 0.71 | 21.33 | 0.13 | 0.18 | 1.49 | 24.92 |
| Young's modulus (MPa) | 586 | 460 | 136 | 20 | 596 | 473 | 119 | 19 |

*Examples of invention

TABLE I-5

Example I-2

| Formulation no. | 1 | 2* | 3* | 4 | 5 | 6* | 7* | 8 | 9 |
|---|---|---|---|---|---|---|---|---|---|
| N6 | 90 | 85 | 75 | 50 | — | — | — | — | — |
| EVOH | — | — | — | — | 90 | 80 | 50 | 25 | — |
| MXD6 | — | — | — | — | — | — | — | — | 80 |
| M-EPM | 10 | 15 | 25 | 50 | 10 | 20 | 50 | 75 | 20 |
| Air permeation coefficient $\times 10^{-12}$ cc·cm/cm²·s·cmHg (at 30° C.) | 1.02 | 1.60 | 3.89 | 36.08 | 0.18 | 0.53 | 13.64 | 205.6 | 0.13 |
| Young's modulus (MPa) | 505 | 393 | 245 | 76 | 622 | 379 | 86 | 25 | 529 |

| Formulation no. | 10* | 11* | 12 | 13 | 14* | 15* | 16 |
|---|---|---|---|---|---|---|---|
| N6 | — | — | — | 34 | 32 | 20 | 10 |
| EVOH | — | — | — | — | — | — | — |
| MXD6 | 75 | 50 | 25 | 51 | 48 | 30 | 15 |
| M-EPM | 25 | 50 | 75 | 15 | 20 | 50 | 75 |
| Air permeation coefficient $\times 10^{-12}$ cc·cm/cm²·s·cmHg (at 30° C.) | 0.24 | 5.57 | 131.4 | 0.24 | 0.42 | 11.80 | 191.0 |
| Young's modulus (MPa) | 405 | 106 | 28 | 552 | 428 | 92 | 26 |

*Examples of invention

TABLE I-6

Example I-3

| Formulation no. | 1 | 2* | 3* | 4 | 5 | 6* | 7* | 8 | 9 | 10* | 11* | 12 |
|---|---|---|---|---|---|---|---|---|---|---|---|---|
| N6 | 95 | 90 | 60 | 50 | 20 | 15 | 10 | 5 | 90 | 80 | 60 | 50 |
| SBR | 5 | 10 | 40 | 50 | — | — | — | — | — | — | — | — |
| Polyester elastomer | — | — | — | — | 80 | 85 | 90 | 95 | — | — | — | — |
| Polyamide elastomer | — | — | — | — | — | — | — | — | 10 | 20 | 40 | 50 |
| Air permeation coefficient (× $10^{-12}$ cc · cm/cm$^2$ · s ·cmHg) (at 30° C.) | 0.58 | 1.05 | 2.88 | 36.53 | 15.51 | 19.41 | 24.28 | 30.38 | 1.06 | 2.63 | 16.13 | 39.92 |
| Young's modulus (MPa) | 521 | 471 | 98 | 58 | 505 | 490 | 477 | 463 | 630 | 500 | 314 | 249 |

*Examples of invention

TABLE I-7

Example I-4

| Formulation no. | 1 | 2* | 3* | 4* | 5* | 6 | 7 | 8* | 9* | 10 | 11 | 12* |
|---|---|---|---|---|---|---|---|---|---|---|---|---|
| PBT | 20 | 30 | 45 | 45 | 60 | 70 | — | — | — | — | — | — |
| AS | — | — | — | — | — | — | 30 | 40 | 60 | 70 | — | — |
| Cellulose acetate | — | — | — | — | — | — | — | — | — | — | 10 | 20 |
| PVDF | — | — | — | — | — | — | — | — | — | — | — | — |
| Aromatic polyimide | — | — | — | — | — | — | — | — | — | — | — | — |
| Br-IPMS | 80 | 70 | 55 | 55 | 40 | 30 | 70 | 60 | 40 | 30 | 90 | 80 |
| ZnO | 0.40 | 0.35 | 0.28 | — | 0.20 | 0.15 | — | — | — | — | — | — |
| Stearic acid | 1.60 | 1.40 | 1.10 | — | 0.80 | 0.60 | — | — | — | — | — | — |
| Zinc stearate | 0.80 | 0.70 | 0.55 | — | 0.40 | 0.30 | — | — | — | — | — | — |
| Air permeation coefficient (× $10^{-12}$ cc · cm/cm$^2$ · s · cmHg) (at 30° C.) | 25.09 | 14.61 | 7.86 | 7.87 | 4.24 | 2.81 | 27.42 | 22.41 | 15.03 | 12.33 | 28.22 | 15.83 |
| Young's modulus (MPa) | 32 | 55 | 123 | 136 | 275 | 501 | 60 | 103 | 302 | 518 | 21 | 36 |

| Formulation no. | 13* | 14 | 15 | 16* | 17* | 18 | 19 | 20* | 21* | 22 |
|---|---|---|---|---|---|---|---|---|---|---|
| PBT | — | — | — | — | — | — | — | — | — | — |
| AS | — | — | — | — | — | — | — | — | — | — |
| Cellulose acetate | 60 | 70 | — | — | — | — | — | — | — | — |
| PVDF | — | — | 20 | 30 | 80 | 90 | — | — | — | — |
| Aromatic polyimide | — | — | — | — | — | — | 10 | 20 | 60 | 70 |
| Br-IPMS | 40 | 30 | 80 | 70 | 20 | 10 | 90 | 80 | 40 | 30 |
| ZnO | — | — | — | — | — | — | — | — | — | — |
| Stearic acid | — | — | — | — | — | — | — | — | — | — |
| Zinc stearate | — | — | — | — | — | — | — | — | — | — |
| Air permeation coefficient (× $10^{-12}$ cc · cm/cm$^2$ · s · cmHg) (at 30° C.) | 1.59 | 0.90 | 26.89 | 16.22 | 2.46 | 1.69 | 25.79 | 9.87 | 0.39 | 0.17 |
| Young's modulus (MPa) | 316 | 545 | 30 | 47 | 446 | 700 | 21 | 36 | 330 | 572 |

*Examples of invention

TABLE I-8

Example I-5

| Formulation no. | 1* | 2* | 3* | 4* | 5* | 6* | 7* | 8* | 9* | 10* | 11* | 12* |
|---|---|---|---|---|---|---|---|---|---|---|---|---|
| N6 | 70 | 50 | 70 | 50 | — | — | — | — | — | — | 28 | 20 |
| MXD6 | — | — | — | — | — | — | 70 | 50 | 70 | 50 | 42 | 30 |
| EVOH | — | — | — | — | 70 | 50 | — | — | — | — | — | — |
| Br-IPMS | 30 | 50 | 30 | 50 | 30 | 50 | 30 | 50 | 30 | 50 | 30 | 50 |
| M-EPM | — | — | — | — | — | — | — | — | — | — | — | — |
| ZnO | — | — | 0.15 | 0.25 | 0.15 | 0.25 | — | — | 0.15 | 0.25 | — | — |
| Stearic acid | — | — | 0.60 | 1.00 | 0.60 | 1.00 | — | — | 0.60 | 1.00 | — | — |
| Zinc Stearate | — | — | 0.30 | 0.50 | 0.30 | 0.50 | — | — | 0.30 | 0.50 | — | — |
| Methylene dianiline | — | — | — | — | — | — | — | — | — | — | — | — |
| Air permeation coefficient (× $10^{-12}$ cc · cm/cm$^2$ · s · cmHg) (at 30° C.) | 1.76 | 4.58 | 1.76 | 4.58 | 0.45 | 1.73 | 0.13 | 0.71 | 0.13 | 0.71 | 0.37 | 1.49 |

TABLE I-8-continued

Example I-5

| Young's modulus (MPa) | 226 | 98 | 203 | 88 | 242 | 100 | 361 | 136 | 325 | 123 | 299 | 119 |
|---|---|---|---|---|---|---|---|---|---|---|---|---|

| | Formulation no. | 13* | 14* | 15* | 16* | 17* | 18* | 19* |
|---|---|---|---|---|---|---|---|---|
| | N6 | 28 | 20 | 70 | 70 | — | — | 28 |
| | MXD6 | 42 | 30 | — | — | — | 70 | 42 |
| | EVOH | — | — | — | — | 70 | — | — |
| | Br-IPMS | 30 | 50 | — | — | — | — | — |
| | M-EPM | — | — | 30 | 30 | 30 | 30 | 30 |
| | ZnO | 0.15 | 0.25 | — | — | — | — | — |
| | Stearic acid | 0.60 | 1.00 | — | — | — | — | — |
| | Zinc stearate | 0.30 | 0.50 | — | — | — | — | — |
| | Methylene dianiline | — | — | — | 0.18 | 0.18 | 0.18 | 0.18 |
| | Air permeation coefficient ($\times 10^{-12}$ cc · cm/cm$^2$ · s · cmHg) (at 30° C.) | 0.37 | 1.49 | 6.08 | 6.08 | 1.56 | 0.44 | 2.13 |
| | Young's modulus (MPa) | 269 | 107 | 194 | 174 | 208 | 278 | 257 |

\* Examples of Invention

TABLE I-9

Example I-6

| Formulation no. | 1* | 2* | 3* | 4* | 5* | 6* | 7 | 8* | 9* | 10* | 11* | 12* |
|---|---|---|---|---|---|---|---|---|---|---|---|---|
| N6 | 90 | 50 | 50 | 20 | 20 | 10 | 36 | 32 | 20 | 20 | 4 | 4 |
| MXD6 | — | — | — | — | — | — | 54 | 48 | 30 | 30 | 6 | 6 |
| CHR | 10 | 50 | 50 | 80 | 80 | 90 | 10 | 20 | 50 | 50 | 90 | 90 |
| MgO | 0.50 | 2.50 | — | 4.00 | — | 4.50 | 0.50 | 1.00 | 2.50 | — | 4.50 | — |
| Stearic acid | 0.20 | 1.00 | — | 1.60 | — | 1.80 | 0.20 | 0.40 | 1.00 | — | 1.80 | — |
| TT | 0.10 | 0.50 | — | 0.80 | — | 0.90 | 0.10 | 0.20 | 0.50 | — | 0.90 | — |
| Air permeation coefficient ($\times 10^{-12}$ cc · cm/cm$^2$ · s · cmHg) (at 30° C.) | 0.66 | 3.59 | 3.57 | 12.80 | 12.60 | 19.61 | 0.04 | 0.07 | 0.71 | 0.70 | 14.21 | 14.19 |
| Young's modulus (MPa) | 483 | 66 | 60 | 15 | 13 | 9 | 693 | 405 | 81 | 73 | 9 | 8 |

*Examples of invention

TABLE I-10

Example I-7

| Formulation no. | 1 | 2* | 3* | 4* | 5 | 6 | 7* | 8* | 9 | 10* | 11* |
|---|---|---|---|---|---|---|---|---|---|---|---|
| N6 | 90 | 80 | 50 | 30 | 20 | — | — | — | — | — | — |
| MXD6 | — | — | — | — | — | 80 | 30 | 10 | 80 | 30 | 10 |
| NBR | 10 | 20 | 50 | 70 | 80 | — | — | — | — | — | — |
| CM | — | — | — | — | — | 20 | 70 | 90 | — | — | — |
| M-CM | — | — | — | — | — | — | — | — | 20 | 70 | 90 |
| Sulfur | 0.10 | 0.20 | 0.50 | 0.70 | 0.80 | — | — | — | — | — | — |
| TT | 0.10 | 0.20 | 0.50 | 0.70 | 0.80 | — | — | — | — | — | — |
| CZ | 0.10 | 0.20 | 0.50 | 0.70 | 0.80 | — | — | — | — | — | — |
| Trimercapto triazine | — | — | — | — | — | 0.30 | 1.05 | 1.35 | 0.30 | 1.05 | 1.35 |
| MDCA | — | — | — | — | — | 0.30 | 1.05 | 1.35 | 0.30 | 1.05 | 1.35 |
| Air permeation coefficient ($\times 10^{-12}$ cc · cm/cm$^2$ · s · cmHg) (at 30° C.) | 0.75 | 1.30 | 6.88 | 20.84 | 36.28 | 0.05 | 3.09 | 15.91 | 0.05 | 3.44 | 18.22 |
| Young's modulus (MPa) | 504 | 319 | 81 | 33 | 21 | 541 | 39 | 14 | 536 | 38 | 13 |

*Examples of invention

TABLE I-11

Example I-8

| Formulation no. | 1* | 2* | 3* | 4* | 5* | 6* | 7* |
|---|---|---|---|---|---|---|---|
| MXD6 | — | — | — | — | — | — | 63 |
| N6 | 63 | — | — | — | — | 63 | — |
| N6/66 | — | 59 | 56 | 61 | 60 | — | — |
| N11 | 19 | 19 | 19 | 19 | 20 | 17 | 17 |

TABLE I-11-continued

Example I-8

| Formulation no. | 1* | 2* | 3* | 4* | 5* | 6* | 7* |
|---|---|---|---|---|---|---|---|
| M-EPM | 18 | 22 | 25 | 20 | 20 | 18 | 18 |
| Caprolactum | — | — | — | — | — | 2 | 2 |
| Air permeation coefficient ($\times 10^{-12}$ cc · cm/cm$^2$ · s · cmHg) (at 30° C.) | 3.94 | 6.21 | 8.07 | 5.22 | 5.38 | 6.52 | 0.61 |
| Young's modulus (MPa) | 319 | 303 | 261 | 334 | 332 | 281 | 428 |

*Examples of invention

Example I-9

The various thermoplastic resin components (A), the elastomer components (B), a third component (polycarbonate), and, in some cases, vulcanization agents, lubricants, or other components were kneaded in the various formulations (parts by weight) shown in Table I-12 by a bi-axial kneader, pelletized, then formed into films of a width of 350 mm and a thickness of 0.2 mm by an extruder.

The air permeation coefficient and Young's modulus of the resultant films were measured. The results are shown in Table I-12.

TABLE I-12

Example I-9

| Formulation no. | 1* | 2* | 3* | 4* | 5 | 6* | 7* | 8* | 9 | 1o* | 11* | 12* | 13* | 14* |
|---|---|---|---|---|---|---|---|---|---|---|---|---|---|---|
| MXD6 | 27 | 21 | 21 | 15 | 12 | 36 | 28 | 20 | 16 | — | — | — | — | — |
| EVOH | — | — | — | — | — | — | — | — | — | 27 | 21 | 21 | 15 | 12 |
| Br-IPMS | 63 | 49 | 49 | 35 | 28 | — | — | — | — | 63 | 49 | 49 | 35 | 28 |
| CHR | — | — | — | — | — | 54 | 42 | 30 | 24 | — | — | — | — | — |
| PC | 10 | 30 | 30 | 50 | 60 | 10 | 39 | 50 | 60 | 10 | 30 | 30 | 50 | 60 |
| ZnO | 0.32 | 0.25 | — | 0.18 | 0.14 | — | — | — | — | 0.32 | 0.25 | — | 0.18 | 0.14 |
| Stearic acid | 1.26 | 1.12 | — | 0.70 | 0.56 | 1.08 | 0.84 | 0.60 | 0.48 | 1.26 | 0.98 | — | 0.70 | 0.56 |
| Zinc stearate | 0.63 | 0.49 | — | 0.35 | 0.28 | — | — | — | — | 0.63 | 0.49 | — | 0.35 | 0.28 |
| MgO | — | — | — | — | — | 2.70 | 2.10 | 1.50 | 1.20 | — | — | — | — | — |
| TT | — | — | — | — | — | 0.54 | 0.42 | 0.30 | 0.24 | — | — | — | — | — |
| Air permeation coefficient ($\times 10^{-12}$ cc · cm/cm$^2$ · s · cmHg) (at 30° C.) | 6.22 | 10.90 | 10.85 | 18.93 | 25.00 | 2.32 | 5.04 | 11.01 | 16.11 | 8.48 | 13.81 | 13.76 | 22.51 | 28.76 |
| Young's modulus (MPa) | 76 | 164 | 148 | 356 | 524 | 77 | 167 | 359 | 528 | 68 | 151 | 136 | 335 | 505 |

*Examples of Invention

Examples I-10 to I-13 and Comparative Example I-1

Various blending agents were mixed into Br-IIR and Br-IPMS to prepare the master batches A and B in a closed Bambury mixer. The formulations of the master batches are shown in Table I-13:

TABLE I-13

Formulation of Master Batches

| | Master batch A | Master batch B |
|---|---|---|
| Br-IIR | 100 | — |
| Br-IPMS | — | 100 |
| GPF | 60 | 60 |
| Stearic acid | 1 | — |
| Petroleum based hydrocarbon | 10 | — |

TABLE I-13-continued

Formulation of Master Batches

| | Master batch A | Master batch B |
|---|---|---|
| resin | | |
| Paraffinic process oil | 10 | 20 |

These master batches were pelletized using a rubber pelletizer, kneaded with resin materials and cross-linking agents by a bi-axial kneader by the various formulations (parts by weight) shown in Table I-14, pelletized, then extruded by an extruder to prepare films of a width of 350 mm and a thickness of 0.1 mm. The air permeation coefficient and Young's modulus of the resultant films were measured. Further, these films were wrapped around tire molding drums, then overlaid with carcasses, sidewalls, treads, and other tire members and inflated to obtain green tires. The green tires were vulcanized by a vulcanizer at 180° C. for 10 minutes to finish them into tires of tire size 165SR13.

On the other hand, as a Comparative Example, a green tire was formed having an inner liner layer of about 0.5 mm, comprised of an unvulcanized butyl rubber, on the inner surface of the green tire through tie rubber of a thickness of about 0.7 mm. This was then vulcanized to finish the tire (size 165SR13). The formulation of the inner liner layer, the air permeation coefficient, and the Young's modulus are shown in Table I-14 in the same way as with the examples. The weights of the inner liners of the pneumatic tires obtained were measured and air leakage tests performed. The results are shown in Table I-14.

TABLE I-14

Examples I-10 to I-13 and Comparative Example I-1

|  | Ex. I-10 | Ex. I-11 | Ex. I-12 | Ex. I-13 | Comp. Ex. I-1 |
|---|---|---|---|---|---|
| N6 | 50 | — | 50 | — | — |
| MXD6 | — | 50 | — | 50 | — |
| Master batch A | 90.5 | 90.5 | — | — | 181 |
| Master batch B | — | — | 90 | 90 | — |
| ZnO | 1.5 | 1.5 | 0.25 | 0.25 | 30 |
| DM | 0.5 | 0.5 | — | — | 1 |
| Sulfur | 0.3 | 0.3 | — | — | 0.6 |
| Stearic acid | — | — | 1 | 1 | — |
| Zinc stearate | — | — | 0.5 | 0.5 | — |
| Air permeation coefficient ($\times 10^{-12}$ cc · cm/cm$^2$ · s · cmHg) (at 30° C.) | 4.33 | 1.02 | 4.13 | 0.98 | 58.2 |
| Young's modulus (MPa) | 91 | 128 | 93 | 130 | 12.2 |
| Rate of fall of internal pressure | 1.5 | 0.4 | 1.4 | 0.4 | 2.7 |
| Inner liner weight (g) | 100 | 100 | 100 | 100 | 650 |

Example I-14

Using the eight types of bromine-modified polyisoprene-p-methylmethylene copolymer rubbers shown in Table I-15, the air permeation coefficient and Young's modulus were evaluated in the same way as shown in the previous examples using as the thermoplastic resin components N11 (Rirusan BESNO TL) (see Table I-1), N6/N66 (Ultramide C35) (see Table I-1), and EVOH (Eval EPE153B) (see Table I-1) and using the formulations of polymers shown in Table I-16, Table I-17, and Table I-18. The results are shown in Table I-14 to Table I-18. Note that the rubber formulation of the modified polyisobutylene rubber was as follows:

| Rubber Formulation | |
|---|---|
| Modified polyisobutylene rubber | 100 parts by weight |
| Zinc stearate | 1 part by weight |
| Stearic acid | 2 parts by weight |
| Zinc White No. 3 | 0.5 part by weight |

TABLE I-15

|  | PMS*[1] (wt %) | Bromine (wt %) | Mooney viscosity ML$_{1+8}$ (120° C.) |
|---|---|---|---|
| Modified polyisobutylene rubber 1 | 7.5 | 2 | 38 |
| Modified polyisobutylene rubber 2 | 7.5 | 2 | 45 |
| Modified polyisobutylene rubber 3*[2] | 5 | 1.2 | 35 |
| Modified polyisobutylene rubber 4*[2] | 5 | 1.2 | 45 |
| Modified polyisobutylene rubber 5*[2] | 5 | 0.8 | 45 |
| Modified polyisobutylene rubber 6*[2] | 7.5 | 2 | 28 |
| Modified polyisobutylene rubber 7*[2] | 7.5 | 0.8 | 45 |
| Modified polyisobutylene rubber 8 | 20 | 1.2 | 45 |

*[1]: PMS: p-methylstyrene
*[2]: Rubber out of scope of present invention

TABLE I-16

|  | 1 (Ex.) | 2 (Ex.) | 3 (Comp. Ex.) | 4 (Comp. Ex.) | 5 (Comp. Ex.) | 6 (Comp. Ex.) | 7 (Comp. Ex.) | 8 (Ex.) |
|---|---|---|---|---|---|---|---|---|
| Modified polyisobutylene rubber 1 | 50 | — | — | — | — | — | — | — |
| Modified polyisobutylene rubber 2 | — | 50 | — | — | — | — | — | — |
| Modified polyisobutylene rubber 3 | — | — | 50 | — | — | — | — | — |
| Modified polyisoburylene rubber 4 | — | — | — | 50 | — | — | — | — |
| Modified polyisobutylene rubber 5 | — | — | — | — | 50 | — | — | — |
| Modified polyisobutylene rubber 6 | — | — | — | — | — | 50 | — | — |
| Modified polyisobutylene rubber 7 | — | — | — | — | — | — | 50 | — |
| Moditied polyisobutylene rubber 8 | — | — | — | — | — | — | — | 50 |
| N11 | 50 | 50 | 50 | 50 | 50 | 50 | 50 | 50 |
| Air permeation coefficient ($\times 10^{-11}$ cc · cm/cm$^2$ · s · cmHg) (at 30° C.) | 1.62 | 1.27 | 3.17 | 2.57 | 2.32 | 2.22 | 1.32 | 0.82 |
| Young's modulus (MPa) | 146.1 | 146.0 | 145.8 | 145.8 | 145.8 | 146.0 | 145.8 | 145.9 |
| TB (MPa) | 30.2 | 30.1 | 30.1 | 30.2 | 30.1 | 30.0 | 27.6 | 30.4 |

TABLE I-17

|  | 9 (Ex.) | 10 (Ex.) | 11 (Comp. Ex.) | 12 (Comp. Ex.) | 13 (Comp. Ex.) | 14 (Comp. Ex.) | 15 (Comp. Ex.) | 16 (Ex.) |
|---|---|---|---|---|---|---|---|---|
| Modified polyisobutylene rubber 1 | 50 | — | — | — | — | — | — | — |
| Modified polyisobutylene rubber 2 | — | 50 | — | — | — | — | — | — |
| Modified polyisobutylene rubber 3 | — | — | 50 | — | — | — | — | — |
| Modified polyisobutylene rubber 4 | — | — | — | 50 | — | — | — | — |
| Modified polyisobutylene rubber 5 | — | — | — | — | 50 | — | — | — |
| Modified polyisobutylene rubber 6 | — | — | — | — | — | 50 | — | — |
| Modified polyisobutylene rubber 7 | — | — | — | — | — | — | 50 | — |
| Modified polyisobutylene rubber 8 | — | — | — | — | — | — | — | 50 |
| N6/66 | 50 | 50 | 50 | 50 | 50 | 50 | 50 | 50 |
| Air permeation coefficient ($\times 10^{-11}$ cc · cm/cm² · s · cmHg) (at 30° C.) | 1.44 | 1.09 | 2.99 | 2.39 | 2.14 | 2.04 | 1.14 | 0.64 |
| Young's modulus (MPa) | 86.6 | 86.5 | 86.3 | 86.3 | 86.3 | 86.5 | 86.3 | 86.4 |
| TB (MPa) | 41.2 | 40.9 | 41.0 | 41.1 | 41.1 | 41.0 | 38.6 | 41.4 |

TABLE I-18

|  | 17 (Ex.) | 18 (Ex.) | 19 (Comp. Ex.) | 20 (Comp. Ex.) | 21 (Comp. Ex.) | 22 (Comp. Ex.) | 23 (Comp. Ex.) | 24 (Ex.) |
|---|---|---|---|---|---|---|---|---|
| Modified polyisobutylene rubber 1 | 50 | — | — | — | — | — | — | — |
| Modified polyisobutylene rubber 2 | — | 50 | — | — | — | — | — | — |
| Modified polyisobutylene rubber 3 | — | — | 50 | — | — | — | — | — |
| Modified polyisobutylene rubber 4 | — | — | — | 50 | — | — | — | — |
| Modified polyisobutylene rubber 5 | — | — | — | — | 50 | — | — | — |
| Modified polyisobutylene rubber 6 | — | — | — | — | — | 50 | — | — |
| Modified polyisobutylene rubber 7 | — | — | — | — | — | — | 50 | — |
| Modified polyisobutylene rubber 8 | — | — | — | — | — | — | — | 50 |
| EVOH | 50 | 50 | 50 | 50 | 50 | 50 | 50 | 50 |
| Air permeation coefficient ($\times 10^{-11}$ cc · cm/cm² · s · cmHg) (at 30° C.) | 1.35 | 1.00 | 2.90 | 2.30 | 2.05 | 1.95 | 1.05 | 0.55 |
| Young's modulus (MPa) | 478.6 | 478.5 | 478.3 | 478.3 | 478.3 | 478.5 | 478.3 | 478.4 |
| TB (MPa) | 36.2 | 36.0 | 36.2 | 36.0 | 36.1 | 36.0 | 33.2 | 36.4 |

As explained above, according to the first aspect of the present invention, it is possible to obtain a tire polymer composition which is suitable for an air permeation prevention layer for a pneumatic tire which enables maintenance of the retention of air pressure in the tire well, maintenance of the flexibility, and lightening of the weight of the tire.

Examples II-1 to II-14

One or two types of the various thermoplastic resin components (A) and (C), the elastomer components (B), and, in some cases, vulcanization agents, lubricants, or other components were kneaded in the various formulations (parts by weight) shown in Table II-1 to Table II-14 by a bi-axial kneader, then continuously pelletized by a resin pelletizer, then the pellets used to form films of a width of 350 mm and a thickness of 0.1 mm by a resin extruder.

The air permeation coefficient and Young's modulus of the resultant films were measured. The results are shown in Table II-1 to II-14.

TABLE II-1

(Example II-1)

| Component | Formulation No. | 1 | 2[*1] | 3[*1] | 4[*1] | 5[*1] | 6[*1] | 7[*1] | 8[*1] | 9[*1] | 10 | 11 | 12 |
|---|---|---|---|---|---|---|---|---|---|---|---|---|---|
| (A) | N6[*2] | 28.0 | 26.6 | 25.2 | 22.4 | 19.6 | 16.8 | 14.0 | 11.2 | 8.4 | 5.6 | 2.8 | — |
|  | MXD6[*3] | 42.0 | 39.9 | 37.8 | 33.6 | 29.4 | 25.2 | 21.0 | 16.8 | 12.6 | 8.4 | 4.2 | — |
| (B) | Br-poly(isoprene-p-methylstyrene) | 30.0 | 28.5 | 27.0 | 24.0 | 21.0 | 18.0 | 15.0 | 12.0 | 9.0 | 6.0 | 3.0 | — |
| (C) | UHMWPE[*4] ($\Delta\gamma c = 1$) | 0 | 5 | 10 | 20 | 30 | 40 | 50 | 60 | 70 | 80 | 90 | 100 |
| Measurement items | Air permeation coefficient ($\times 10^{-12}$ cc · cm/cm² · s · cmHg) (at 30° C.) | 0.48 | 0.60 | 0.75 | 1.18 | 1.86 | 2.93 | 4.60 | 7.22 | 11.34 | 17.82 | 28.00 | 44.00 |
|  | Young's modulus (MPa) | 299 | 310 | 321 | 344 | 369 | 395 | 424 | 454 | 487 | 522 | 560 | 600 |
|  | Melt-fusion with rubber | x | Δ | ○ | ○ | ○ | ○ | ○ | ○ | ○ | ○ | ○ | ○ |

[*1]: Example of invention
[*2]: CM4061 (Toray. 6-nylon)
[*3]: Reny 6002 (Mitsubishi Gas Chemical. copolymer nylon)
[*4]: Hizex-million (240M) (Mitsui Petrochemical Industries)

TABLE II-2

(Example II-2)

| Component | Formulation No. | 1 | 2[*1] | 3[*1] | 4[*1] | 5[*1] | 6[*1] | 7[*1] | 8[*1] | 9[*1] | 10 | 11 | 12 |
|---|---|---|---|---|---|---|---|---|---|---|---|---|---|
| (A) | N6[*2] | 28.0 | 26.6 | 25.2 | 22.4 | 19.6 | 16.8 | 14.0 | 11.2 | 8.4 | 5.6 | 2.8 | — |
|  | MXD6[*3] | 42.0 | 39.9 | 37.8 | 33.6 | 29.4 | 25.2 | 21.0 | 16.8 | 12.6 | 8.4 | 4.2 | — |
| (B) | Br-poly(isoprene-p-methylstyrene) | 30.0 | 28.5 | 27.0 | 24.0 | 21.0 | 18.0 | 15.0 | 12.0 | 9.0 | 6.0 | 3.0 | — |
| (C) | EEA[*4] ($\Delta\gamma c = 3$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · s · cmHg) (at 30° C.) | 0.48 | 0.63 | 0.82 | 1.40 | 2.38 | 4.06 | 6.93 | 11.82 | 20.16 | 34.38 | 58.63 | 100.00 |
|  | Young's modulus (MPa) | 299 | 275 | 252 | 213 | 180 | 152 | 128 | 108 | 91 | 77 | 65 | 55 |
|  | Melt-fusion with rubber | x | Δ | ○ | ○ | ○ | ○ | ○ | ○ | ○ | ○ | ○ | ○ |

[*1]: Example of invention
[*2]: CM4061 (Toray. 6-nylon)
[*3]: Reny 6002 (Mitsubishi Gas Chemical. copolymer nylon)
[*4]: NUC-6070 (Unitika. ethylene-ethylacrylate copolymer)

TABLE II-3

(Example II-3)

| Component | Formulation No. | 1 | 2[*1] | 3[*1] | 4[*1] | 5[*1] | 6[*1] | 7[*1] | 8[*1] | 9[*1] | 10 | 11 | 12 |
|---|---|---|---|---|---|---|---|---|---|---|---|---|---|
| (A) | EVOH[*2] | 70.0 | 66.5 | 63.0 | 56.0 | 49.0 | 42.0 | 35.0 | 28.0 | 21.0 | 14.0 | 7.0 | — |
| (B) | Br-poly(isoprene-p-methylstyrene) | 30.0 | 28.5 | 27.0 | 24.0 | 21.0 | 18.0 | 15.0 | 12.0 | 9.0 | 6.0 | 3.0 | — |
| (C) | UHMWPE[*3] ($\Delta\gamma c = 1$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · s · cmHg) (at 30° C.) | 0.41 | 0.52 | 0.65 | 1.04 | 1.66 | 2.65 | 4.24 | 6.77 | 10.81 | 17.26 | 27.55 | 44.00 |
|  | Young's modulus (MPa) | 269 | 280 | 291 | 316 | 342 | 371 | 402 | 435 | 472 | 511 | 554 | 600 |
|  | Melt-fusion with rubber | x | Δ | ○ | ○ | ○ | ○ | ○ | ○ | ○ | ○ | ○ | ○ |

[*1]: Example of invention
[*2]: Eval EPE153B (Kuraray)
[*3]: Hizex-million (240M) (Mitsui Petrochemical Industries)

TABLE II-4

(Example II-4)

| Component | Formulation No. | 1 | 2[*1] | 3[*1] | 4[*1] | 5[*1] | 6[*1] | 7[*1] | 8[*1] | 9[*1] | 10 | 11 | 12 |
|---|---|---|---|---|---|---|---|---|---|---|---|---|---|
| (A) | EVOH[*2] | 70.0 | 66.5 | 63.0 | 56.0 | 49.0 | 42.0 | 35.0 | 28.0 | 21.0 | 14.0 | 7.0 | — |
| (B) | Br-poly(isoprene-p-methylstyrene) | 30.0 | 28.5 | 27.0 | 24.0 | 21.0 | 18.0 | 15.0 | 12.0 | 9.0 | 6.0 | 3.0 | — |
| (C) | EEA[*3] ($\Delta\gamma c = 1$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · s · cmHg) (at 30° C.) | 0.41 | 0.54 | 0.71 | 1.23 | 2.13 | 3.69 | 6.39 | 11.08 | 19.20 | 33.28 | 57.69 | 100.00 |
|  | Young's modulus (MPa) | 269 | 248 | 230 | 196 | 167 | 143 | 122 | 104 | 89 | 76 | 64 | 55 |
|  | Melt-fusion with rubber | x | Δ | ○ | ○ | ○ | ○ | ○ | ○ | ○ | ○ | ○ | ○ |

[*1]: Example of invention
[*2]: Eval EPE153B (Kuraray)
[*3]: Hizex-million (240M) (Mitsui Petrochemical Industries)

TABLE II-5

(Example II-5)

| Component | Formulation No. | 1[*1] | 2[*1] | 3[*1] | 4[*1] | 5[*1] | 6[*1] |
|---|---|---|---|---|---|---|---|
| (A) | N6[*2] | 25.2 | 21.6 | 18.0 | — | — | — |
|  | MXD6[*3] | 37.8 | 32.4 | 27.0 | — | — | — |
|  | EVOH[*4] | — | — | — | 72.0 | 63.0 | 45.0 |
| (B) | Br-poly(isoprene-p-methylstyrene) | 27.0 | 36.0 | 45.0 | 18.0 | 27.0 | 45.0 |
| (C) | UHMWPE[*5] ($\gamma c = 29$ mN/m) | 10 | 10 | 10 | 10 | 10 | 10 |
| Measurement | Air permeation coefficient | 0.75 | 1.37 | 2.49 | 0.35 | 0.65 | 2.24 |

TABLE II-5-continued (Example II-5)

| Component | Formulation No. | 1*1 | 2*1 | 3*1 | 4*1 | 5*1 | 6*1 |
|---|---|---|---|---|---|---|---|
| items | ($\times 10^{-12}$ cc · cm/cm$^2$ · s · cmHg) (at 30° C.) | | | | | | |
| | Young's modulus (MPa) | 321 | 212 | 140 | 435 | 291 | 131 |
| | Melt-fusion with rubber | ○ | ○ | ○ | ○ | ○ | ○ |

*1: Example of invention
*2: CM4061 (Toray, 6-nylon)
*3: Reny 6002 (Mitsubishi Gas Chemical. copolymer nylon)
*4: Eval EPE153B (Kuraray)
*5: Hizex-million (240M) (Mitsui Petrochemical Industries)

TABLE II-6

(Example II-6)

| Component | Formulation No. | 1 | 2*1 | 3*1 | 4*1 | 5*1 | 6 | 7 |
|---|---|---|---|---|---|---|---|---|
| (A) | N6*2 | 28.0 | 25.2 | 25.2 | 25.2 | 25.2 | 25.2 | 25.2 |
| | MXD6*3 | 42.0 | 37.8 | 37.8 | 37.8 | 37.8 | 37.8 | 37.8 |
| (B) | Br-poly(isoprene-p-methylstyrene) | 30.0 | 27.0 | 27.0 | 27.0 | 27.0 | 27.0 | 27.0 |
| (C) | Bondability imparting substance (each 10 phr added) | Not added | PP*4 | EP copolymer*5 | SBS*6 | SEBS*7 | Fluorine TPE*8 | Polyester TPE*9 |
| Measurement items | Critical surface tension γc (mN/m) | — | 28 | 28 | 32 | 32 | 23 | 39 |
| | Air permeation coefficient ($\times 10^{-12}$ cc · cm/cm$^2$ · s · cmHg) (at 30° C.) | 0.48 | 0.79 | 1.15 | 0.98 | 1.03 | 0.69 | 0.74 |
| | Young's modulus (MPa) | 299 | 314 | 222 | 217 | 222 | 265 | 312 |
| | Melt-fusion with rubber | x | ○ | ○ | ○ | ○ | x | x |

Note that the facing rubber was SBR/NR (50 parts/50 parts) having γc of 30 mN/m
*1: Example of invention
*2: CM-4061 (Toray. 6-nylon)
*3: Reny 6002 (Mitsubishi Gas Chemical. copolymer nylon)
*4: Polypropylene MS230 (Tokuyama Soda)
*5: Ethylene-propylene copolymer R210E (Tokuyama Soda)
*6: Styrene-butadiene-styrene copolymer TRKX655 Crayton D (Shell Kagaku)
*7: Styrene-ethylene-butadiene-styrene copolymer G1652 Crayton G (Shell Kagaku)
*8: Fluorine thermoplastic resin CEFRAL SOPT (Central Glass)
*9: Polyester thermoplastic resin Hytrel 5577 (Toray-Dupont)

TABLE II-7

(Example II-7)

| Component | Formulation No. | 1 | 2*1 | 3*1 | 4*1 | 5*1 | 6*1 | 7*1 | 8*1 | 9*1 | 10 | 11 | 12 |
|---|---|---|---|---|---|---|---|---|---|---|---|---|---|
| (A) | N6*2 | 28.0 | 26.6 | 25.2 | 22.4 | 19.6 | 16.8 | 14.0 | 11.2 | 8.4 | 5.6 | 2.8 | — |
| | MXD6*2 | 42.0 | 39.9 | 37.8 | 33.6 | 29.4 | 25.2 | 21.0 | 16.8 | 12.6 | 8.4 | 4.2 | — |
| (B) | Br-IIR*3 | 30.0 | 28.5 | 27.0 | 24.0 | 21.0 | 18.0 | 15.0 | 12.0 | 9.0 | 6.0 | 3.0 | — |
| (C) | UHMWPE*2 (Δγc = 1) | 0 | 5 | 10 | 20 | 30 | 40 | 50 | 60 | 70 | 80 | 90 | 100 |
| Measurement items | Air permeation coefficient ($\times 10^{-12}$ · cm/cm$^2$ · s · cmHg) (at 30° C.) | 0.49 | 0.62 | 0.77 | 1.21 | 1.90 | 2.98 | 4.66 | 7.30 | 11.44 | 17.93 | 28.09 | 44.00 |
| | Young's modulus (MPa) | 287 | 298 | 309 | 333 | 358 | 386 | 415 | 447 | 481 | 518 | 557 | 600 |
| | Melt-fusion with rubber | x | Δ | ○ | ○ | ○ | ○ | ○ | ○ | ○ | ○ | ○ | ○ |

*1: Example of invention
*2: See notes of previous table.
*3: Br-IIR (Exxon Bromobutyl 2244. Exxon Chemical)

TABLE II-8

(Example II-8)

| Component | Formulation No. | 1 | 2*1 | 3*1 | 4*1 | 5*1 | 6*1 | 7*1 | 8*1 | 9*1 | 10 | 11 | 12 |
|---|---|---|---|---|---|---|---|---|---|---|---|---|---|
| (A) | N6*2 | 28.0 | 26.6 | 25.2 | 22.4 | 19.6 | 16.8 | 14.0 | 11.2 | 8.4 | 5.6 | 2.8 | — |
| | MXD6*2 | 42.0 | 39.9 | 37.8 | 33.6 | 29.4 | 25.2 | 21.0 | 16.8 | 12.6 | 8.4 | 4.2 | — |
| (B) | MAH-g-EPM*3 | 30.0 | 28.5 | 27.0 | 24.0 | 21.0 | 18.0 | 15.0 | 12.0 | 9.0 | 6.0 | 3.0 | — |

TABLE II-8-continued (Example II-8)

| Component | Formulation No. | 1 | 2*1 | 3*1 | 4*1 | 5*1 | 6*1 | 7*1 | 8*1 | 9*1 | 10 | 11 | 12 |
|---|---|---|---|---|---|---|---|---|---|---|---|---|---|
| (C) | UHMWPE*2 ($\Delta\gamma c = 1$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · s · cmHg) (at 30° C.) | 1.62 | 1.91 | 2.26 | 3.14 | 4.37 | 6.08 | 8.45 | 11.75 | 16.35 | 22.74 | 31.63 | 44.00 |
| | Young's modulus (MPa) | 257 | 265 | 279 | 304 | 331 | 360 | 392 | 427 | 465 | 506 | 551 | 600 |
| | Melt-fusion with rubber | x | Δ | ○ | ○ | ○ | ○ | ○ | ○ | ○ | ○ | ○ | ○ |

*1: Example of invention
*2: See notes of previous table.
*3: MAH-g-EPM: Tafmer MP0610 (Mitsui Petrochemical Industries)

TABLE II-9

(Example II-9)

| Component | Formulation No. | 1 | 2*1 | 3*1 | 4*1 | 5*1 | 6*1 | 7*1 | 8*1 | 9*1 | 10 | 11 | 12 |
|---|---|---|---|---|---|---|---|---|---|---|---|---|---|
| (A) | N6*2 | 28.0 | 26.6 | 25.2 | 22.4 | 19.6 | 16.8 | 14.0 | 11.2 | 8.4 | 5.6 | 2.8 | — |
| | MXD6*2 | 42.0 | 39.9 | 37.8 | 33.6 | 29.4 | 25.2 | 21.0 | 16.8 | 12.6 | 8.4 | 4.2 | — |
| (B) | Br-IIR*2 | 30.0 | 28.5 | 27.0 | 24.0 | 21.0 | 18.0 | 15.0 | 12.0 | 9.0 | 6.0 | 3.0 | — |
| (C) | EEA*2 ($\Delta\gamma c = 3$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · s · cmHg) (at 30° C.) | 0.49 | 0.64 | 0.84 | 1.43 | 2.43 | 4.13 | 7.03 | 11.95 | 20.33 | 34.57 | 58.80 | 100.00 |
| | Young's modulus (MPa) | 287 | 265 | 244 | 206 | 175 | 148 | 126 | 107 | 90 | 77 | 65 | 55 |
| | Melt-fusion with rubber | x | Δ | ○ | ○ | ○ | ○ | ○ | ○ | ○ | ○ | ○ | ○ |

*1: Example of invention
*2: See notes of previous table.

TABLE II-10

(Example II-10)

| Component | Formulation No | 1 | 2*1 | 3*1 | 4*1 | 5*1 | 6*1 | 7*1 | 8*1 | 9*1 | 10 | 11 | 12 |
|---|---|---|---|---|---|---|---|---|---|---|---|---|---|
| (A) | N6*2 | 28.0 | 26.6 | 25.2 | 22.4 | 19.6 | 16.8 | 14.0 | 11.2 | 8.4 | 5.6 | 2.8 | — |
| | MXD6*2 | 42.0 | 39.9 | 37.8 | 33.6 | 29.4 | 25.2 | 21.0 | 16.8 | 12.6 | 8.4 | 4.2 | — |
| (B) | MAH-g-EPM*3 | 30.0 | 28.5 | 27.0 | 24.0 | 21.0 | 18.0 | 15.0 | 12.0 | 9.0 | 6.0 | 3.0 | — |
| (C) | EEA*2 ($\Delta\gamma c = 3$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · s · cmHg) (at 30° C.) | 1.62 | 1.99 | 2.45 | 3.70 | 5.59 | 8.44 | 12.74 | 19.24 | 29.05 | 43.86 | 66.23 | 100.00 |
| | Young's modulus (MPa) | 257 | 238 | 220 | 189 | 162 | 139 | 119 | 102 | 87 | 75 | 64 | 55 |
| | Melt-fusion with rubber | x | Δ | ○ | ○ | ○ | ○ | ○ | ○ | ○ | ○ | ○ | ○ |

*1: Example of invention
*2: See notes of previous table.
*3: MAH-g-EPM: Tafmer MP0610 (Mitsui Petrochemical Industries)

TABLE II-11

(Example II-11)

| Component | Formulation No. | 1 | 2*1 | 3*1 | 4*1 | 5*1 | 6*1 | 7*1 | 8*1 | 9*1 | 10 | 11 | 12 |
|---|---|---|---|---|---|---|---|---|---|---|---|---|---|
| (A) | PBT*3 | 60.0 | 57.0 | 54.0 | 48.0 | 42.0 | 36.0 | 30.0 | 24.0 | 18.0 | 12.0 | 6.0 | — |
| (B) | Br-IIR*2 | 40.0 | 38.0 | 36.0 | 32.0 | 28.0 | 24.0 | 20.0 | 16.0 | 12.0 | 8.0 | 4.0 | — |
| (C) | UHMWPE*2 ($\Delta\gamma c = 1$) | 0 | 5 | 10 | 20 | 30 | 40 | 50 | 60 | 70 | 80 | 90 | 100 |
| Measurement items | Air permeation coefficient ($\times 10^{-12}$ cc · cm/cm$^2$ · | 4.41 | 4.95 | 5.55 | 6.99 | 8.79 | 11.07 | 13.93 | 17.53 | 22.07 | 27.77 | 34.96 | 44.00 |

TABLE II-11-continued (Example II-11)

| Component | Formulation No. | 1 | 2*¹ | 3*¹ | 4*¹ | 5*¹ | 6*¹ | 7*¹ | 8*¹ | 9*¹ | 10 | 11 | 12 |
|---|---|---|---|---|---|---|---|---|---|---|---|---|---|
| items | s · cmHg) (at 30° C.) | | | | | | | | | | | | |
| | Young's modulus (MPa) | 290 | 301 | 312 | 335 | 361 | 388 | 417 | 449 | 482 | 519 | 558 | 600 |
| | Melt-fusion with rubber | x | Δ | ○ | ○ | ○ | ○ | ○ | ○ | ○ | ○ | ○ | ○ |

*¹: Example of invention
*²: See notes of previous table.
*³: PBT: Ultradur B4550 (BASF)

TABLE II-12

(Example II-12)

| Component | Formulation No. | 1 | 2*¹ | 3*¹ | 4*¹ | 5*¹ | 6*¹ | 7*¹ | 8 | 9 | 10 | 11 | 12 |
|---|---|---|---|---|---|---|---|---|---|---|---|---|---|
| (A) | PBT*² | 60.0 | 57.0 | 54.0 | 48.0 | 42.0 | 36.0 | 30.0 | 24.0 | 18.0 | 12.0 | 6.0 | — |
| (B) | Br-IIR*² | 40.0 | 38.0 | 36.0 | 32.0 | 28.0 | 24.0 | 20.0 | 16.0 | 12.0 | 8.0 | 4.0 | — |
| (C) | EEA*² (Δγc = 3) | 0 | 5 | 10 | 20 | 30 | 40 | 50 | 60 | 70 | 80 | 90 | 100 |
| Measurement items | Air permeation coefficient ($\times 10^{-12}$ cc · cm/cm² · s · cmHg) (at 30° C.) | 4.41 | 5.15 | 6.03 | 8.23 | 11.25 | 15.37 | 21.00 | 28.69 | 39.20 | 53.57 | 73.19 | 100.00 |
| | Young's modulus (MPa) | 290 | 267 | 246 | 208 | 176 | 149 | 126 | 107 | 91 | 77 | 65 | 55 |
| | Melt-fusion with rubber | x | Δ | ○ | ○ | ○ | ○ | ○ | ○ | ○ | ○ | ○ | ○ |

*¹: Example of invention
*²: See notes of previous table.

TABLE II-13

(Example II-13)

| Component | Formulation No. | 1 | 2*¹ | 3*¹ | 4*¹ | 5*¹ | 6*¹ | 7*¹ | 8*¹ | 9*¹ | 10 | 11 | 12 |
|---|---|---|---|---|---|---|---|---|---|---|---|---|---|
| (A) | PBT*² | 60.0 | 57.0 | 54.0 | 48.0 | 42.0 | 36.0 | 30.0 | 24.0 | 18.0 | 12.0 | 6.0 | — |
| (B) | Br-poly(isoprene-p-methylstyrene) | 40.0 | 38.0 | 36.0 | 32.0 | 28.0 | 24.0 | 20.0 | 16.0 | 12.0 | 8.0 | 4.0 | — |
| (C) | UHMWPE*² (γΔc = 1) | 0 | 5 | 10 | 20 | 30 | 40 | 50 | 60 | 70 | 80 | 90 | 100 |
| Measurement items | Air permeation coefficient ($\times 10^{-12}$ cc · cm/cm² · s · cmHg) (at 30° C.) | 4.24 | 4.77 | 5.36 | 6.78 | 8.56 | 10.82 | 13.67 | 17.27 | 21.82 | 27.56 | 34.83 | 44.00 |
| | Young's modulus (MPa) | 306 | 316 | 327 | 350 | 374 | 401 | 428 | 458 | 490 | 524 | 561 | 600 |
| | Melt-fusion with rubber | x | Δ | ○ | ○ | ○ | ○ | ○ | ○ | ○ | ○ | ○ | ○ |

*¹: Example of invention
*²: See notes of previous table.

TABLE II-14

(Example II-14)

| Component | Formulation No. | 1 | 2*¹ | 3*¹ | 4*¹ | 5*¹ | 6*¹ | 7*¹ | 8 | 9 | 10 | 11 | 12 |
|---|---|---|---|---|---|---|---|---|---|---|---|---|---|
| (A) | PBT*² | 60.0 | 57.0 | 54.0 | 48.0 | 42.0 | 36.0 | 30.0 | 24.0 | 18.0 | 12.0 | 6.0 | — |
| (B) | Br-poly(isoprene-p-methylstyrene) | 40.0 | 38.0 | 36.0 | 32.0 | 28.0 | 24.0 | 20.0 | 16.0 | 12.0 | 8.0 | 4.0 | — |
| (C) | EEA*² (Δγc = 3) | 0 | 5 | 10 | 20 | 30 | 40 | 50 | 60 | 70 | 80 | 90 | 100 |
| Measurement items | Air permeation coefficient ($\times 10^{-12}$ cc · cm/cm² · s · cmHg) (at 30° C.) | 4.24 | 4.97 | 5.82 | 7.99 | 10.95 | 15.02 | 20.60 | 28.26 | 38.76 | 53.16 | 72.91 | 100.00 |
| | Young's modulus (MPa) | 306 | 281 | 258 | 217 | 183 | 154 | 130 | 109 | 92 | 78 | 65 | 55 |
| | Melt-fusion with rubber | x | Δ | ○ | ○ | ○ | ○ | ○ | ○ | ○ | ○ | ○ | ○ |

*¹: Example of invention
*²: See notes of previous table.

Examples II-15 and II-16 and Comparative Examples II-1 and II-2

Various blending agents were mixed into Br-IIR or Br-poly(isoprene-p-methylstyrene) (Br-IPMS) and kneaded in a closed Bambury mixer, then a rubber roll was used to form rubber sheets of a thickness of 2.5 mm to prepare the master batches A and B.

The sheets of the master batch A or B were pelletized by a rubber pelletizer. The pellets were used to knead the components (A) and (C) with the master batch in the various formulations (parts by weight) shown in Table II-15 by a b-axial kneader, then a vulcanization system was added and the rubber master batch component dispersed as a domain in a resin matrix during the kneading was dynamically vulcanized. The elastomer component kneaded by the bi-axial kneader was extruded into strands and the polymer composition was further pelletized by a resin pelletizer, then the pellets were used to prepare films of a width of 350 mm and a thickness of 0.05 mm by a resin extruder. The air permeation coefficient and the Young's modulus of the resultant films were measured.

These films were wrapped around tire molding drums, then overlaid with carcasses, sidewalls, treads, and other tire members and inflated to obtain green tires. The green tires were vulcanized by a vulcanizer at 185° C. for 15 minutes at a pressure of 2.3 MPa to finish them into tires of tire size 165SR13.

On the other hand, as Comparative Example II-1, a green tire was formed having an inner liner layer of about 0.5 mm, comprised of an unvulcanized butyl rubber composition shown in the following formulation table on the inner surface of the green tire through tie rubber of a thickness of about 0.7 mm. This was then vulcanized to finish the tire (size 165SR13).

| Butyl rubber formulation (unit: parts by weight) | |
| --- | --- |
| Br-IIR | 100 |
| Carbon black (GPF) | 60 |
| Stearic acid | 1 |
| Petroleum based hydrocarbon resin[*1] | 10 |
| Paraffinic process oil | 10 |
| No. 3 ZnO | 3 |
| DM | 1 |
| Sulfur | 0.6 |

[*1]Escolets 1102 made by Esso Chemical.

Further, as Comparative Example II-2, a tire was prepared without using a thermoplastic resin with a critical surface tension difference with the facing rubber layer of not more than 3 mN/m.

The weight of the inner liner layer (air permeation prevention layer) of the resultant pneumatic tire was measured and an air leakage test and tire durability test were run, whereupon the results shown in Table II-15 were obtained.

TABLE II-15

| Component | Formulation no. | Ex. 15[*1] | Ex. 16[*2] | Comp. Ex. 1 | Comp. Ex. 2[*1] |
| --- | --- | --- | --- | --- | --- |
| (A) | N6[*3] | 25.2 | 25.2 | General | 28.0 |
|  | MXD6[*3] | 37.8 | 37.8 | tire | 42.0 |
| (B) | Master batch | 48.9 | 48.9 | using | 54.3 |
|  |  | (27) | (27) | butyl | (30) |

TABLE II-15-continued

| Component | Formulation no. | Ex. 15[*1] | Ex. 16[*2] | Comp. Ex. 1 | Comp. Ex. 2[*1] |
| --- | --- | --- | --- | --- | --- |
| (C) | EEA[*3] | 10.0 |  | rubber |  |
|  | SBS[*3] |  | 10.0 |  |  |
| Cross-linking system | ZnO | 1.5 | 1.5 |  | 1.5 |
|  | DM | 0.5 | 0.5 |  | 0.5 |
|  | Sulfur | 0.3 | 0.3 |  | 0.3 |
| Measurement items | Air permeation coefficient ($\times 10^{-12}$ cc · cm/cm$^2$ · s · cmHg) (at 30° C.) | 0.84 | 0.98 | 55 | 0.49 |
|  | Young's modulus (MPa) | 244 | 217 | 15 | 287 |
|  | Rate of decline of internal pressure (%/month) | 0.63 | 0.74 | 2.7 | 0.38 |
|  | Inner liner weight (g) | 46 | 46 | 650 | 46 |
|  | Tire durability | ○ | ○ | ○ | x |

[*1]: Using master batch A of the following formulation:
Formulation of Master Batch A

| Br-IIR | 100 |
| --- | --- |
| GPF | 60 |
| Stearic acid | 1 |
| Petroleum based hydrocarbon resin | 10 |
| Paraffinic process oil | 10 |

Br-IIR: Exxon Bromobutyl 2244 (Exxon Chemical)
GPF: Seast V (Tokai Carbon)
Petroleum-based hydrocarbon resin: Escolet 1102 (Esso)
Paraffinic process oil: Machine Oil 22 (Showa Shell Sekiyu)
[*2]: Using master batch B of the following formulation:
Formulation of Master Batch B

| Br-IPMS (XP-50) | 100 |
| --- | --- |
| GPF | 60 |
| Stearic acid | 1 |
| Petroleum based hydrocarbon resin | 10 |
| Paraffinic process oil | 10 |

XP-50: Exxon Butyl (Exxon Chemical)
GPF: Seast V (Tokai Carbon)
Petroleum-based hydrocarbon resin: Escolet 1102 (Esso)
Parafinic process oil: Machine Oil 22 (Showa Shell Sekiyu)
[*3]: See notes of previous tables.

As explained above, according to the second aspect of the present invention, it is possible to obtain a tire polymer composition which is suitable for an air permeation prevention layer for a pneumatic tire which enables maintenance of the retention of air pressure in the tire well and maintenance of the flexibility, is superior in the bonding with rubber, and enables lightening of the weight of the tire.

Examples III-1 to III-8 and Comparative Examples III-1 to III-2

The thermoplastic resin component (A) and bondability imparting resin component (D) were charged into a first charging port of a bi-axial kneader and extruder in the various formulations (parts by weight) shown in Table III-1 and kneaded and melted, then the elastomer component (B) was charged in from a second charging port and kneaded to make (B) the dispersed phase and the components (A) and (C) become the continuous phase. The kneaded product was extruded into strands from the front end of the bi-axial kneader and extruder, cooled by water, then pelletized by a resin pelletizer. The pellets were formed into films of a width of 350 mm and a thickness of 0.05 mm by a resin extruder. The films were wrapped around tire molding drums, then overlaid with carcasses, sides, belts, treads, and other tire members and inflated to form green tires. The green tires were vulcanized by a vulcanizer at 185° C. for 15 minutes at a pressure of 2.3 MPa to finish them into tires of a tire size 165SR13.

The films and tires were evaluated as to their various performances. The results are shown in Table III-1.

Comparative Example III-3

A green tire was formed having an inner liner layer of about 0.5 mm, comprised of an unvulcanized butyl rubber of the formulation shown in the following table, on the inner surface of the green tire through tie rubber of a thickness of about 0.7 mm. This was then vulcanized to finish the tire (size 165SR13). The results are shown in Table III-1.

| Butyl Rubber Formulation (Unit: Parts by weight) | |
|---|---|
| Br-IIR*1 | 100 |
| Carbon black (GPF)*2 | 60 |
| Stearic acid | 1 |
| Petroleum based hydrocarbon resin*3 | 10 |
| Paraffinic process oil*4 | 10 |
| No. 3 ZnO | 3 |
| DM | 1 |
| Sulfur | 0.6 |

*1Exxon Bromobutyl 2244 (Exxon Chemical)
*2Seast V (Tokai Carbon)
*3Escolets 1102 made by Esso Chemical.
*4Machine oil 22 (Showa-Shell Oil)

TABLE III-1

| Formulation | Ex. 1 | Ex. 2 | Ex. 3 | Ex. 4 | (Parts by weight) Ex. 5 |
|---|---|---|---|---|---|
| N6*1 (A) | 25.2 | 25.2 | 25.2 | 25.2 | 25.2 |
| MXD6*2 (A) | 37.8 | 37.8 | 37.8 | 37.8 | 37.8 |
| Br-poly(isoprene-p methylstyrene)*3 (B) | 27.0 | 27.0 | 27.0 | 27.0 | 27.0 |
| Bondability imparting substance (D) (added weight) | PP*4 (10) | EP copolymer*5 (10) | N6/N66/N610*6 (10) | N6/N66/N610/N12*7 (10) | SEBS*8 (10) |
| Melting point of bondability imparting substance | 150° C. | 155° C. | 180° C. | 180° C. | 110° C. |
| Air permeation coefficient (× 10$^{-12}$ cc · cm/cm$^2$ · s · cmHg) | 0.79 | 1.15 | 0.63 | 0.70 | 1.03 |
| Young's modulus (MPa) (at 30° C.) | 314 | 222 | 317 | 309 | 222 |
| Air permeation prevention layer gauge (mm) | 0.05 | 0.05 | 0.05 | 0.05 | 0.05 |
| Air permeation prevention layer weight (g) | 46 | 46 | 46 | 46 | 46 |
| Rate of fall in internal pressure (%/month) | 0.61 | 0.56 | 0.49 | 0.54 | 0.78 |
| Durability of splice portion | Pass | Pass | Pass | Pass | Pass |
| Stability of thickness of air permeation prevention layer | 0.05 | 0.09 | 0.06 | 0.09 | 0.09 |

| Formulation | Ex. 6 | Ex. 7 | Ex. 8 | Comp. Ex. 1 | Comp. Ex. 2 | Comp. Ex. 3 |
|---|---|---|---|---|---|---|
| N6*1 (A) | 25.2 | 22.4 | 19.6 | 28.2 | 11.2 | butyl rubber |
| MXD6*2 (A) | 37.8 | 33.6 | 29.4 | 42.0 | 16.8 | — |
| Br-poly(isoprene-p methylstyrene)*3 (B) | 27.0 | 24.0 | 21.0 | 30.0 | 12.0 | — |
| Bondability imparting substance (D) (added weight) | EEA*9 (10) | EEA*9 (20) | EEA*9 (30) | Not added (0) | EEA*9 (60) | — |
| Melting point of bondability imparting substance | 100° C. | 100° C. | 100° C. | — | 100° C. | — |
| Air permeation coefficient (× 10$^{-12}$ cc · | 0.82 | 1.40 | 2.38 | 0.48 | 11.82 | 55.00 |
| Young's modulus (MPa) (at 30° C.) | 252 | 213 | 180 | 299 | 108 | 15 |
| Air permeation prevention layer gauge (mm) | 0.05 | 0.05 | 0.05 | 0.05 | 0.05 | 0.5 |
| Air permeation prevention layer weight (g) | 46 | 46 | 46 | 46 | 46 | 480 |
| Rate of fall in internal pressure (%/month) | 0.63 | 1.03 | 1.61 | 0.38 | 4.68 | 3.02 |
| Durability of splice portion | Pass | Pass | Pass | Fail | Pass | Pass |

TABLE III-1-continued

|  |  |  |  |  |  | (Parts by weight) |
|---|---|---|---|---|---|---|
| Stability of thickness of air permeation prevention layer | 0.10 | 0.10 | 0.09 | — | 0.25 | — |

*1: N6: Toray CM4061
*2: MXD6: Mitsubishi Gas Chemical Reny 6002
*3: Br-poly(isoprene-p-methylstyrene): Exxon Chemical Exxon Butyl XP50
*4: PP: Tokuyama Soda MS230
*5: EP copolymer: Tokuyama Soda R210E
*6: N6/N66/N610: Toray CM4001
*7: N6/N66/N610/N12: Toray CM8001
*8: SEBS: Shell Kagaku Crayton G G1652
*9: EEA: Unitika NUC-6070
Examples 3 and 4 used compatibility agents and maleic acid modified polyolefins.

Examples III-9 to III-17 and Comparative Examples III-4 to III-6

Films obtained in the same way as in Examples III-1 to III-8 and Comparative Examples III-1 to III-3 except that the elastomer components were changed to Br-IIR and films obtained using PBT as the thermoplastic resin and Br-IIR as the elastomer component were used to prepare tires by the same method as in Example III-1. The performances of the tires were evaluated. The results are shown in Table III-2.

TABLE III-2

(Parts by weight)

| Formulation | Ex. III-9 | Ex. III-10 | Ex. III-11 | Ex. III-12 |
|---|---|---|---|---|
| N6*1 (A) | 25.2 | 25.2 | 25.2 | 25.2 |
| PBT*10 (A) |  |  |  |  |
| MXD6*2 (A) | 37.8 | 37.8 | 37.8 | 37.8 |
| Br-11R*3 (B) | 27.0 | 27.0 | 27.0 | 27.0 |
| Bondability imparting substance | PP*4 | EP copolymer*5 | N6/N66/N610*6 | N6/N66/N610/N12*7 |
| (D) (added weight) | (10) | (10) | (10) | (10) |
| Melting point of bondability imparting substance | 150° C. | 155° C. | 180° C. | 110° C. |
| Air permeation coefficient (30° C.) ($\times 10^{-12}$ cc · cm/cm$^2$ · s · cmHg) | 0.81 | 1.18 | 0.65 | 0.72 |
| Young's modulus (MPa) | 302 | 214 | 305 | 298 |
| Air permeation prevention layer gauge (mm) | 0.05 | 0.05 | 0.05 | 0.05 |
| Air permeation prevention layer weight (g) | 46 | 46 | 46 | 46 |
| Rate of fall in internal pressure (%/month) | 0.62 | 0.88 | 0.51 | 0.56 |
| Durability of splice portion | Pass | Pass | Pass | Pass |
| Stability of thickness of air permeation prevention layer | 0.06 | 0.10 | 0.06 | 0.09 |

| Formulation | Ex. III-13 | Ex. III-14 | Ex. III-15 | Ex. III-16 | Ex. III-17 |
|---|---|---|---|---|---|
| N6*1 (A) | 25.2 | 25.2 | 22.4 | 19.6 |  |
| PBT*10 (A) |  |  |  |  | 54.0 |
| MXD6*2 (A) | 37.8 | 37.8 | 33.6 | 29.4 |  |
| Br-11R*3 (B) | 27.0 | 27.0 | 24.0 | 21.0 | 36.0 |
| Bondability imparting substance | SEBS*8 | EEA*9 | EEA*9 | EEA*9 | EEA*9 |
| (D) (added weight) | (10) | (10) | (20) | (30) | (10) |
| Melting point of bondability imparting substance | 110° C. | 100° C. | 100° C. | 100° C. | 100° C. |
| Air permeation coefficient (30° C.) ($\times 10^{-12}$ cc · cm/cm$^2$ · s · cmHg) | 1.06 | 0.84 | 1.43 | 2.43 | 6.03 |
| Young's modulus (MPa) | 214 | 244 | 206 | 175 | 246 |
| Air permeation prevention layer gauge (mm) | 0.05 | 0.05 | 0.05 | 0.05 | 0.05 |
| Air permeation prevention layer weight (g) | 46 | 46 | 46 | 46 | 46 |
| Rate of fall in internal pressure (%/month) | 0.80 | 0.64 | 1.04 | 1.64 | 3.21 |
| Durability of splice portion | Pass | Pass | Pass | Pass | Pass |
| Stability of thickness of air permeation prevention layer | 0.10 | 0.09 | 0.10 | 0.09 | 0.08 |

*1N6: Toray CM4061
*2: MXD6: Mitsubishi Gas Chemical Reny 6002
*3: Br-IIR: Exxon Chemical Exxon Bromobutyl 2244
*4: PP: Tokuyama Soda MS230
*5: EP copolymer: Tokuyama Soda R210E TABLE III-2-continued (Parts by weight)

*6: N6/N66/N610: Toray CM4001
*7: N6/N66/N610/N12: Turay CM8001
*8: SEBS: Shell Kagaku Crayton G G1652
*9: EEA: Unitika NUC-6070
*10: PBT: BASF: Ultradur B4550
Examples 11 and 12 used compatibility agents and maleic acid modified polyolefins.

| Formulation | Comp. Ex. III-3 | Comp. Ex. III-4 | Comp. Ex. III-5 | Comp. Ex. III-6 |
|---|---|---|---|---|
| N6*1 (A) | butyl rubber | 28.2 | 11.2 | 25.2 |
| MXD6*2 (A) | — | 42.0 | 16.8 | 37.8 |
| Br-IIR*3 (B) | — | 30.0 | 12.0 | 27.0 |
| Bondability imparting substance (D) (added weight) | — | Not added (0) | EEA*9 (60) | PAR*10 (10) |
| Melting point of bondability imparting substance | — | — | 100° C. | 290° C. |
| Air permeation coefficient ($\times 10^{-12}$ cc · cm/cm² · sec · cmHg) (at 30° C.) | 55.00 | 0.49 | 11.95 | 0.78 |
| Young's modulus (MPa) | 15 | 287 | 107 | 347 |
| Air permeation prevention layer gauge (mm) | 0.5 | 0.05 | 0.05 | 0.05 |
| Air permeation prevention layer weight (g) | 480 | 46 | 46 | 46 |
| Rate of fall in internal preasure (%/month) | 3.02 | 0.39 | 4.71 | 0.60 |
| Durability of splice portion | Pass | Fail | Pass | Fail |
| Stability of thickness of air permeation prevention layer | — | — | 0.25 | — |

*1: N6: Toray CM4061
*2: MXD6: Mitsubishi Gas Chemical Reny 6002
*3: Br-IIR: Exxon Chemical Exxon Bromobutyl 2244
*4: PP: Tokuyama Soda MS230
*5: EP copolymer: Tokuyama Soda R210E
*6: N6/N66/N610: Toray CM4001
*7: N6/N66/N610/N12: Toray CM8001
*8: SEBS: Shell Kagaku Crayton G G1652
*9: EEA: Unitika NUC-6070
*10: PAR: Polyacrylate Resin: Unitika U-100

Examples III-18 to III-20

Various blending agents, except the vulcanization agent, were mixed into Br-IIR and Br-IPMS to prepare the master batches A and B in a closed Bambury mixer. The master batches of the rubber composition were formed into sheets of a thickness of 3 mm by a rubber roll which were then pelletized using a rubber pelletizer. The formulations of the master batches are shown in Table III-3.

TABLE III-3

Formulation of Master Batches

| | Master batch A | Master batch B |
|---|---|---|
| Br-IIR | 100 | — |
| Br-IPMS | — | 100 |
| Carbon black (GPF) | 60 | 60 |
| Stearic acid | 1 | — |
| Petroleum based hydrocarbon resin | 10 | — |
| Paraffinic process oil | 10 | 20 |

The thermoplastic resin component (A) and bondability imparting resin component (D) were charged into a first charging port of a bi-axial extruder in the various formulations (parts by weight) shown in Table III-4 and kneaded and melted, then the master batch (B) was charged from the second charging port and kneaded so that (B) became the dispersed phase and the components (A) and (D) became the continuous phase.

Further, the vulcanization agent etc. were charged from a third charging port and the dispersed elastomer layer was made to cross-link and cure. The mixture was extruded into strands from the front end of the bi-axial kneader and extruder and cooled with water, then pelletized using a resin pelletizer. The pellets were formed into films of a width of 350 mm and a thickness of 0.05 mm by a resin extruder. The air permeation coefficient and the Young's modulus of the resultant films were measured. Further, the films were wrapped around tire molding drums, then overlaid with carcasses, sidewalls, treads, and other tire members and inflated to obtain green tires. The green tires were vulcanized by a vulcanizer at 185° C. for 15 minutes at a pressure of 2.3 MPa to finish them into tires of tire size 165SR13.

The weights of the inner liners of the pneumatic tires obtained were measured and air leakage tests were performed. The results are shown in Table III-4.

TABLE III-4

| | Ex. III-18 | Ex. III-19 | Ex. III-20 |
|---|---|---|---|
| N6 (A) | 25.2 | 25.2 | 25.2 |
| MXD6 (A) | 37.8 | 37.8 | 37.8 |
| Master batch A (B) | 67 | 67 | — |
| Master batch B (B) | — | — | 67 |
| ZnO | 1.8 | 1.2 | 0.2 |
| DM | 0.6 | 0.4 | — |
| Sulfur | 0.3 | 0.2 | — |
| Stearic acid | — | — | 0.8 |
| Zinc stearate | — | — | 0.4 |
| Bondability imparting substance (D) (added weight) | N6/N66/N610/N12(10) | EEA (10) | N6/N66/N610/N12(10) |
| Melting point of bondability imparting substance | 180° C. | 100° C. | 180° C. |
| Air permeation coefficient (30° C.) ($\times 10^{-12}$ cc · cm/cm² ·sec · cmHg) | 0.65 | 0.81 | 0.68 |
| Young's modulus (MPa) | 300 | 248 | 310 |
| Air permeation prevention layer gauge (mm) | 0.05 | 0.05 | 0.05 |
| Air permeation prevention | 48 | 48 | 48 |

TABLE III-4-continued

|  | Ex. III-18 | Ex. III-19 | Ex. III-20 |
|---|---|---|---|
| layer weight (g) |  |  |  |
| Rate of fall in internal Pressure (%/month) | 0.55 | 0.64 | 0.55 |
| Durability of splice portion | Pass | Pass | Pass |
| Stability of thickness of air permeation prevention layer | 0.09 | 0.10 | 0.09 |

As explained above, according to the third aspect of the present invention, it is possible to obtain a pneumatic tire having an air permeation prevention layer which enables maintenance of the retention of air pressure in the tire well and maintenance of the flexibility, is superior in the bonding with rubber, is superior in bonding with layers such as the liner layer during molding of the tire, and enables lightening of the weight of the tire.

Examples IV-1 to IV-3

For the combinations of the air permeation prevention layers comprised of the various thermoplastic resins (A) and elastomer components (B) with the bondability imparting layers in the formulations (parts by weight) and constitutions shown in Table IV-1 to Table IV-3, the air permeation prevention layers (thickness of 0.05 mm) before lamination were formed into sheets of a width of 350 mm by an ordinary resin extruder and were evaluated in the air permeation coefficient and Young's modulus. Next, these films were wrapped around tire molding drums, then the similarly prepared 0.02 mm films of the bondability imparting layers were wrapped, then these were overlaid with carcasses, sidewalls, treads, and other tire members and inflated to form green tires. The green tires were vulcanized by a vulcanizer at 185° C. for 15 minutes at a pressure of 2.3 MPa to finish them into tires of a tire size of 165SR13. The rate of reduction in the internal pressure of these tires and the tire durabilities were evaluated. The results are shown in Table IV-1 to Table IV-3.

TABLE IV-1

(Ex. IV-1)

| Formulation no. | 1 | 2[*1] | 3[*1] | 4[*1] | 5[*1] | 6[*1] | 7 | (Parts by weight) 8 |
|---|---|---|---|---|---|---|---|---|
| Air permeation prevention layer |  |  |  |  |  |  |  |  |
| N6[*2] (A) | 28.0 | 28.0 | 28.0 | 28.0 | 28.0 | 28.0 | 28.0 | 28.0 |
| MXD6[*3] (A) | 42.0 | 42.0 | 42.0 | 42.0 | 42.0 | 4.20 | 42.0 | 42.0 |
| Br-poly(isoprene-p-methylstyrene)[*4] (B) | 30.0 | 30.0 | 30.0 | 30.0 | 30.0 | 30.0 | 30.0 | 30.0 |
| Critical surface tension γc (mN/m) |  | 35 | 35 | 35 | 35 | 35 | 35 | 35 |
| Bondability imparting layer | Non | PP[*5] | EP copolymer[*6] | SBS[*7] | SEBS[*8] | EEA[*9] | Fluorine TPE[*10] | Polyester TPE[*11] |
| Critical surface tension γc (mN/m) |  | 28 | 28 | 32 | 32 | 27 | 23 | 39 |
| Air permeation coefficient (30° C.) (× 10$^{-12}$ cc · cm/cm$^2$ · sec · cmHg) | 0.48 | 0.48 | 0.48 | 0.48 | 0.48 | 0.48 | 0.48 | 0.48 |
| Young's modulus (MPa) | 299 | 299 | 299 | 299 | 299 | 299 | 299 | 299 |
| Air permeation prevention layer gauge (mm) | 0.05 | 0.05 | 0.05 | 0.05 | 0.05 | 0.05 | 0.05 | 0.05 |
| Air permeation prevention layer weight (g) | 46 | 46 | 46 | 46 | 46 | 46 | 46 | 46 |
| Rate of fall in internal pressure (%/month) | 0.38 | 0.38 | 0.38 | 0.38 | 0.38 | 0.38 | 0.38 | 0.38 |
| Tire durability | x | ○ | ○ | ○ | ○ | ○ | x | x |

Note:
Facing bonded rubber is SBR/NR (50 parts/50 parts) with γc of 30 mN/m.
[*1]Examples of invention.
[*2]: N6: Toray CM4061
[*3]: MXD6: Mitsubishi Gas Chemical Reny 6002
[*4]: Br-poly(isoprene-p-methylstyrene): Exxon Chemical Exxon Butyl XP50
[*5]: PP: Tokuyama Soda MS230
[*6]: EP copolymer: Tokuyama Soda R210E
[*7]: SBS: Shell Kagaku Crayton D TRKX655
[*8]: SFBS: Shell Kagaku Crayton G G1652
[*9]: EEA: Unitika NUC-6070
[*10]: Fluorine TPE: Central Glass CEFRAL SOFT
[*11]: Polyester TPE: Toray-Dupont Hytrel 5577
[*5], [*6], and [*9] have added as compatibility agents Mitsui Petrochemical's maleic acid modified polyethylene propylene resin Tafmer MP-0610 in 10% by weight with respect to total weight of resin.

TABLE IV-2

(Ex. IV-2)

| Formulation no. | 1[*1] | 2[*1] | 3[*1] | 4[*1] | 5[*1] | (Parts by weight) 6[*1] |
|---|---|---|---|---|---|---|
| Air permeation prevention layer |  |  |  |  |  |  |
| N6[*2] (A) | 28.0 | 24.0 | 20.0 | — | — | — |
| MXD6[*3] (A) | 42.0 | 36.0 | 30.0 | — | — | — |
| EVOH[*4] (A) | — | — | — | S0.0 | 70.0 | 50.0 |
| Br-poly(isoprene-p-methylstyrene)[*5] (B) | 30.0 | 40.0 | 50.0 | 20.0 | 30.0 | 50.0 |
| Critical surface tension γc (mN/m) | 35 | 33 | 32 | 31 | 31 | 30 |
| Bondability imparting layer (UHMWPE[*6]) (γc = 29) | Yes | Yes | Yes | Yes | Yes | Yes |

TABLE IV-2-continued (Ex. IV-2)

| Formulation no. | 1[*1] | 2[*1] | 3[*1] | 4[*1] | 5[*1] | 6[*1] |
|---|---|---|---|---|---|---|
| | | | | | (Parts by weight) | |
| Air permeation coefficient (30° C.) ($\times 10^{-12}$ cc · cm/cm² · sec · cmHg) | 0.48 | 0.93 | 1.81 | 0.21 | 0.41 | 1.61 |
| Young's modulus (MPa) | 299 | 189 | 119 | 419 | 269 | 111 |
| Air permeation prevention layer gauge (mm) | 0.05 | 0.05 | 0.05 | 0.05 | 0.05 | 0.05 |
| Air permeation prevention layer weight (g) | 46 | 46 | 46 | 46 | 46 | 46 |
| Rate of fall in internal pressure (%/month) | 0.38 | 0.71 | 1.28 | 0.17 | 0.33 | 1.16 |
| Tire durability | ○ | ○ | ○ | ○ | ○ | ○ |

Note:
Facing bonded rubber is SBR/NR (50 parts/50 parts) with γc of 30 mN/m.
[*1]: Examples of invention.
[*2]: N6: Toray CM4061
[*3]: MXD6: Mitsubishi Gas Chemical Reny 6002
[*4]: EVOH: Kuraray Eval EPE153B
[*5]: Br-poly(isoprene-p-methylstyrene): Exxon Chemical Exxon Butyl XP50
[*6]: UHMWPE: Mitsui Petrochemical Hizex-million (240M)
The bondability imparting layers of formulation nos. 1 and 2 similarly have added as compatibility agents Mitsui Petrochemical's maleic acid modified polyethylene propylene resin Tafmer MP-0610 in 10% by weight with respect to total weight of resin.

TABLE IV-3

(Ex. IV-3)

| Formulation no. | 1[*1] | 2[*1] | 3[*1] | 4[*1] | 5[*1] | 6[*1] | 7 |
|---|---|---|---|---|---|---|---|
| | | | | | | (Parts by weight) | |
| Air permeation prevention layer | | | | | | | |
| N6[*2] (A) | 28.0 | 25.2 | 22.4 | 19.6 | 16.8 | 14.0 | 5.6 |
| MXD6[*3] (A) | 42.0 | 37.8 | 33.6 | 29.4 | 25.2 | 21.0 | 8.4 |
| Br-poly(isoprene-p-methylstyrene)[*4] (B) | 30.0 | 27.0 | 24.0 | 21.0 | 18.0 | 15.0 | 6.0 |
| EEA[*5] (A) | — | 10.0 | 20.0 | 30.0 | 40.0 | 50.0 | 80.0 |
| Critical surface tension γc (mN/m) | 35 | 32 | 30 | 30 | 29 | 29 | 27 |
| Bondability imparting layer (UHMWPE[*6]) | Yes | Yes | Yes | Yes | Yes | Yes | Yes |
| (critical surface tension γc = 29 mN/m) | | | | | | | |
| Air permeation coefficient (30° C.) ($\times 10^{-12}$ cc · cm/cm² · sec · cmHg) | 0.48 | 0.82 | 1.40 | 2.38 | 4.06 | 6.93 | 34.38 |
| Young's modulus (MPa) | 299 | 252 | 213 | 180 | 152 | 128 | 77 |
| Air permeation prevention layer gauge (mm) | 0.05 | 0.05 | 0.05 | 0.05 | 0.05 | 0.05 | 0.05 |
| Air permeation prevention layer weight (g) | 46 | 46 | 46 | 46 | 46 | 46 | 46 |
| Rate of fall in internal pressure (%/month) | 0.38 | 0.63 | 1.03 | 1.61 | 2.44 | 3.50 | 6.83 |
| Tire durability | ○ | ○ | ○ | ○ | ○ | ○ | ○ |

Note: Facing bonded rubber is SBR/NR (50 parts/50 parts) with γc of 30 mN/m.
[*1]: Examples of invention.
[*2]: N6: Toray CM4061
[*3]: MXD6: Mitsubishi Gas Chemical Reny 602
[*4]: Br-poly(isoprene-p-methylstyrene): Exxon Chemical Exxon Butyl XP50
[*5]: EEA: Unitika NUC-6070
[*6]: UHMWPE: Mitsui Petrochemical Hizex-million (240M)
Tbe bondability imparting layer of formulation no. 1 similarly has added as compatibility agents Mitsui Petrochemicals maleic acid modified polyethylene propylene resin Tafmer MP-0610 in 10% by weight with respect to total weight of resin.

Example IV-4 and Comparative Example IV-1

Various blending agents were mixed with Br-IIR or BR-poly(isoprene-p-methylstyrene) (Br-IPMS) to prepare the master batches A and B in a closed Bambury mixer.

The master batch A or B was pelletized using a rubber pelletizer and the pellets were kneaded by a bi-axial kneader in the various formulations (parts by weight) shown in Table IV-4. These polymer compositions were pelletized by a resin pelletizer, then were extruded by a resin extruder to form films of a width of 350 mm and a thickness of 0.05 mm. The air permeation coefficient and Young's modulus of the resultant films were measured.

These films were wrapped around tire molding drums, then films of 0.02 mm of ethylene-ethylacrylate copolymer (EEA) were wrapped around them as bondability imparting layers, then these were overlaid with carcasses, sidewalls, treads, and other tire members and inflated to obtain green tires. The green tires were vulcanized by a vulcanizer at 185° C. for 15 minutes at a pressure of 2.3 MPa to finish them into tires of tire size 165SR13.

On the other hand, as a comparative example, a green tire was formed having an inner liner layer of about 0.5 mm, comprised of an unvulcanized butyl rubber composition shown in the following formulation table, on the inner surface of the green tire through tie rubber of a thickness of about 0.7 mm. This was then vulcanized to finish the tire (size 165SR13).

| Butyl Rubber Formulation (Unit: Parts by weight) | |
| --- | --- |
| Br-IIR | 100 |
| Carbon black (GPF) | 60 |
| Stearic acid | 1 |
| Petroleum based hydrocarbon resin*1 | 10 |
| Paraffinic process oil | 10 |
| No. 3 ZnO | 3 |
| DM | 1 |
| Sulfur | 0.6 |

*1Escolets 1102 made by Esso Chemical.

The weights of the inner liner layers of the obtained pneumatic tires were measured and air leakage tests and tire durability tests were run. The results are shown in Table IV-4.

TABLE IV-4

| Formulation no. | Ex. IV-4-1*1 | Ex. IV-4-2*2 | Comp. Ex. IV-1 |
| --- | --- | --- | --- |
| N6*3 (A) | 25.2 | 25.2 | General tire using butyl rubber |
| MXD6*3 (A) | 37.8 | 37.8 | |
| Master batch (B) | 48.9 | 48.9 | |
| | (27) | (27) | |
| ZnO | 1.5 | 1.5 | |
| DM | 0.5 | 0.5 | |
| Sulfur | 0.3 | 0.3 | |
| Air permeation coefficient ($\times 10^{-12}$ cc · cm/cm² · sec · cmHg) (at 30° C.) | 0.84 | 0.98 | 55 |
| Young's modulus (MPa) | 244 | 217 | 12.2 |
| Rate of fall in internal pressure (%/month) | 0.63 | 0.74 | 2.7 |
| Air permeation prevention layer weight (g) | 46 | 46 | 650 |
| Tire durability | ○ | ○ | ○ |

*1: Using master batch A of the following formulation:
Formulation of Master Batch A

| Br-IIR | 100 |
| --- | --- |
| GPF | 60 |
| Stearic acid | 1 |
| Petroleum based hydrocarbon resin | 10 |
| Paraffinic process oil | 10 |

Br-IIR: Exxon Bromobutyl 2244 (Exxon Chemical)
GPF: Seast V (Tokai Carbon)
Petroleum-based hydrocarbon resin: Escorez 1102 (Esso)
Paraffinic process oil: Machine Oil 22 (Showa Shell Sekiyu)
*2: Using master batch B of the following formulation:
Formulation of Master Batch B

| Br-IPMS (XP-50) | 100 |
| --- | --- |
| GPF | 60 |
| Stearic acid | 1 |
| Petroleum based hydrocarbon resin | 10 |
| Paraffinic process oil | 10 |

XP-50: Br-IPMS (Exxon Chemical)
GPF: Seast V (Tokai Carbon)
Petroleum-based hydrocarbon resin: Escorez 1102 (Esso)
Paraffinic process oil: Machine Oil 22 (Showa Shell Sekiyu)
*3: See notes of previous tables.

As explained above, according to the fourth aspect of the present invention, it is possible to obtain a pneumatic tire which enables maintenance of the retention of air pressure in the tire well and maintenance of the flexibility, is superior in the bonding with rubber, and enables lightening of the weight of the tire.

What is claimed is:

1. A process of producing a pneumatic tire containing:

an air permeation prevention layer of a polymer composition having an air permeation coefficient of $25 \times 10^{-12}$ cc·cm/cm²·sec·cmHg (at 30° C.) or less and a Young's modulus of 1 to 500 MPa, comprising:

(A) at least 10% by weight, based on the weight of the total polymer component, of at least one thermoplastic resin selected from the group consisting of polyamide resins, polyester resins, polynitrile resins, polymethacrylate resins, polyvinyl resins, cellulose resins, fluorine resins, and imide resins, said thermoplastic resin having an air permeation coefficient of $25 \times 10^{-12}$ cc·cm/cm²·sec·cmHg (at 30° C.) or less and a Young's modulus of more than 500 MPa and (B) at least 10% by weight, based on the total weight of the polymer component, of at least one elastomer component having an air permeation coefficient of more than $25 \times 10^{-12}$ cc·cm/cm²·sec·cmHg (at 30° C.) and a Young's modulus of not more than 500 MPa, comprising the steps of:

(i) dynamically vulcanizing the elastomer component (B) of the polymer composition in the presence of a vulcanization agent during melting and kneading of the polymer composition, followed by forming a thin film of the polymer composition having a structure of the vulcanized elastomer component (B) dispersed as a discontinuous phase in a matrix of the thermoplastic resin (A);

(ii) arranging the thin film of the polymer composition as the air permeation preventive layer in a green tire, and (iii) vulcanizing the green tire to form the pneumatic tire.

2. The process of claim 1, wherein the elastomer component (B) is at least one elastomer selected from the group consisting of diene rubbers and the hydrogenates thereof, olefin rubbers, halogen-containing rubbers, silicone rubbers, sulfur-containing rubbers, fluoro rubbers, and thermoplastic elastomers.

\* \* \* \* \*